US009884250B2

(12) United States Patent
Jaouen

(10) Patent No.: US 9,884,250 B2
(45) Date of Patent: *Feb. 6, 2018

(54) DIRECTIONAL GAME CONTROLLER

(71) Applicant: Guillemot Corporation S.A., Chantepie (FR)

(72) Inventor: Jean-Yves Jaouen, Saint Jean la Poterie (FR)

(73) Assignee: Guillemot Corporation S.A., Chantepie (FR)

(*) Notice: Subject to any disclaimer, the term of this patent is extended or adjusted under 35 U.S.C. 154(b) by 181 days.

This patent is subject to a terminal disclaimer.

(21) Appl. No.: 14/584,373

(22) Filed: Dec. 29, 2014

(65) Prior Publication Data

US 2015/0119145 A1 Apr. 30, 2015

Related U.S. Application Data

(63) Continuation of application No. 13/090,052, filed on Apr. 19, 2011, now Pat. No. 8,920,240.

(30) Foreign Application Priority Data

May 12, 2010 (FR) ...................................... 10 53757
Oct. 27, 2010 (FR) ...................................... 10 58873

(51) Int. Cl.
A63F 9/24 (2006.01)
A63F 13/245 (2014.01)
(Continued)

(52) U.S. Cl.
CPC .......... *A63F 13/245* (2014.09); *A63F 13/803* (2014.09); *A63F 13/24* (2014.09);
(Continued)

(58) Field of Classification Search
CPC ........ A63F 13/00; A63F 13/005; A63F 13/02; A63F 13/06; A63F 13/24; A63F 13/245
(Continued)

(56) References Cited

U.S. PATENT DOCUMENTS 4,603,752 A 8/1986 Chambers et al.
4,660,671 A 4/1987 Behr et al.
(Continued)

FOREIGN PATENT DOCUMENTS

EP 1201276 5/2002
JP H06277366 10/1994
(Continued)

OTHER PUBLICATIONS

French Search Report dated Mar. 27, 2013, FR Application No. 1053757.
(Continued)

*Primary Examiner* — William H McCulloch, Jr.
*Assistant Examiner* — Chase Leichliter
(74) *Attorney, Agent, or Firm* — Blakely Sokoloff Taylor & Zafman LLP

(57) ABSTRACT

The invention has for object a game controller having an actuator (2, 102) mobile in rotation in relation to a fixed part (3, 103), in such a way as to simulate a control of the rotation of a steering column of a simulated vehicle.
According to the invention, the game controller implements means for detecting the displacement in rotation of the actuator (2, 102) comprising at least one Hall effect or magnetoresistive effect detecting unit, constituted of at least two elements, of which a permanent magnet and a magnetic sensor (24, 124). At least during the rotation of the actuator (2, 102), a first element is integral in rotation with the actuator (2, 102) and a second element is integral in rotation with said fixed part (3, 103).

20 Claims, 11 Drawing Sheets

(51) Int. Cl.
*A63F 13/803* (2014.01)
*A63F 13/285* (2014.01)
*A63F 13/24* (2014.01)

(52) U.S. Cl.
CPC ..... *A63F 13/285* (2014.09); *A63F 2300/1037* (2013.01); *A63F 2300/1062* (2013.01); *A63F 2300/8017* (2013.01)

(58) Field of Classification Search
USPC ................. 463/36–38, 47; 273/148 R, 148 B
See application file for complete search history.

(56) References Cited

U.S. PATENT DOCUMENTS

| | | | |
|---|---|---|---|
| 5,056,787 A | 10/1991 | Mitsuyoshi | |
| 5,203,563 A | 4/1993 | Loper, III | |
| 5,277,584 A | 1/1994 | DeGroat et al. | |
| 5,317,336 A | 5/1994 | Hall | |
| 5,589,828 A | 12/1996 | Armstrong | |
| 5,589,854 A | 12/1996 | Tsai | |
| 5,618,995 A | 4/1997 | Otto et al. | |
| 5,629,594 A | 5/1997 | Jacobus et al. | |
| 5,727,188 A | 3/1998 | Hayes | |
| 5,823,876 A * | 10/1998 | Unbehand | A63F 13/06 273/442 |
| 5,829,745 A | 11/1998 | Houle | |
| 5,951,018 A | 9/1999 | Mamitsu | |
| 5,989,123 A | 11/1999 | Tosaki et al. | |
| 6,020,875 A * | 2/2000 | Moore | A63F 13/02 345/156 |
| 6,203,432 B1 * | 3/2001 | Roberts | A63F 13/06 273/148 B |
| 6,279,906 B1 | 8/2001 | Sanderson et al. | |
| 6,283,859 B1 | 9/2001 | Carlson et al. | |
| 6,296,571 B1 | 10/2001 | McVicar | |
| 6,342,880 B2 | 1/2002 | Rosenberg et al. | |
| 6,480,183 B1 | 11/2002 | Van Ruymbeke et al. | |
| 6,752,716 B1 | 6/2004 | Nishimura et al. | |
| 6,976,677 B1 | 12/2005 | McVicar | |
| 7,662,042 B2 | 2/2010 | Oswald | |
| 7,753,787 B2 | 7/2010 | Arche et al. | |
| 7,775,884 B1 | 8/2010 | McCauley | |
| 8,072,418 B2 | 12/2011 | Crawford et al. | |
| 8,088,005 B2 | 1/2012 | Burgel et al. | |
| 2001/0046897 A1 | 11/2001 | Hagiwara et al. | |
| 2001/0052893 A1 | 12/2001 | Jolly et al. | |
| 2002/0128064 A1 * | 9/2002 | Sobota | A63F 13/06 463/37 |
| 2003/0171190 A1 | 9/2003 | Rice | |
| 2004/0104887 A1 | 6/2004 | Tsukamoto et al. | |
| 2005/0042578 A1 | 2/2005 | Ammon et al. | |
| 2006/0197741 A1 | 9/2006 | Biggadike | |
| 2007/0077783 A1 | 4/2007 | Becker et al. | |
| 2007/0265077 A1 | 11/2007 | Tom et al. | |
| 2007/0298877 A1 | 12/2007 | Rosenberg | |
| 2008/0070197 A1 | 3/2008 | Yu | |
| 2008/0140340 A1 | 6/2008 | Barthomeuf et al. | |
| 2008/0297328 A1 * | 12/2008 | Crawford | G08B 6/00 340/407.2 |
| 2010/0048308 A1 | 2/2010 | Lee et al. | |
| 2010/0160016 A1 | 6/2010 | Shimabukuro et al. | |
| 2010/0163333 A1 * | 7/2010 | Patil | B62D 15/0215 180/402 |
| 2011/0190058 A1 | 8/2011 | Houston et al. | |
| 2011/0256930 A1 | 10/2011 | Jaouen | |

FOREIGN PATENT DOCUMENTS

| | | |
|---|---|---|
| JP | H11297528 | 10/1999 |
| WO | WO-0026891 | 5/2000 |
| WO | WO-2006088182 | 8/2006 |

OTHER PUBLICATIONS

French Search Report dated Apr. 25, 2013, FR Application No. 1058873.
Preliminary Search Report and Written Opinion dated Mar. 10, 2011, FR Application No. 1058873.
Preliminary Search Report dated Jan. 31, 2011, FR Application No. 1053757.

* cited by examiner

FIG. 10A  FIG. 10B

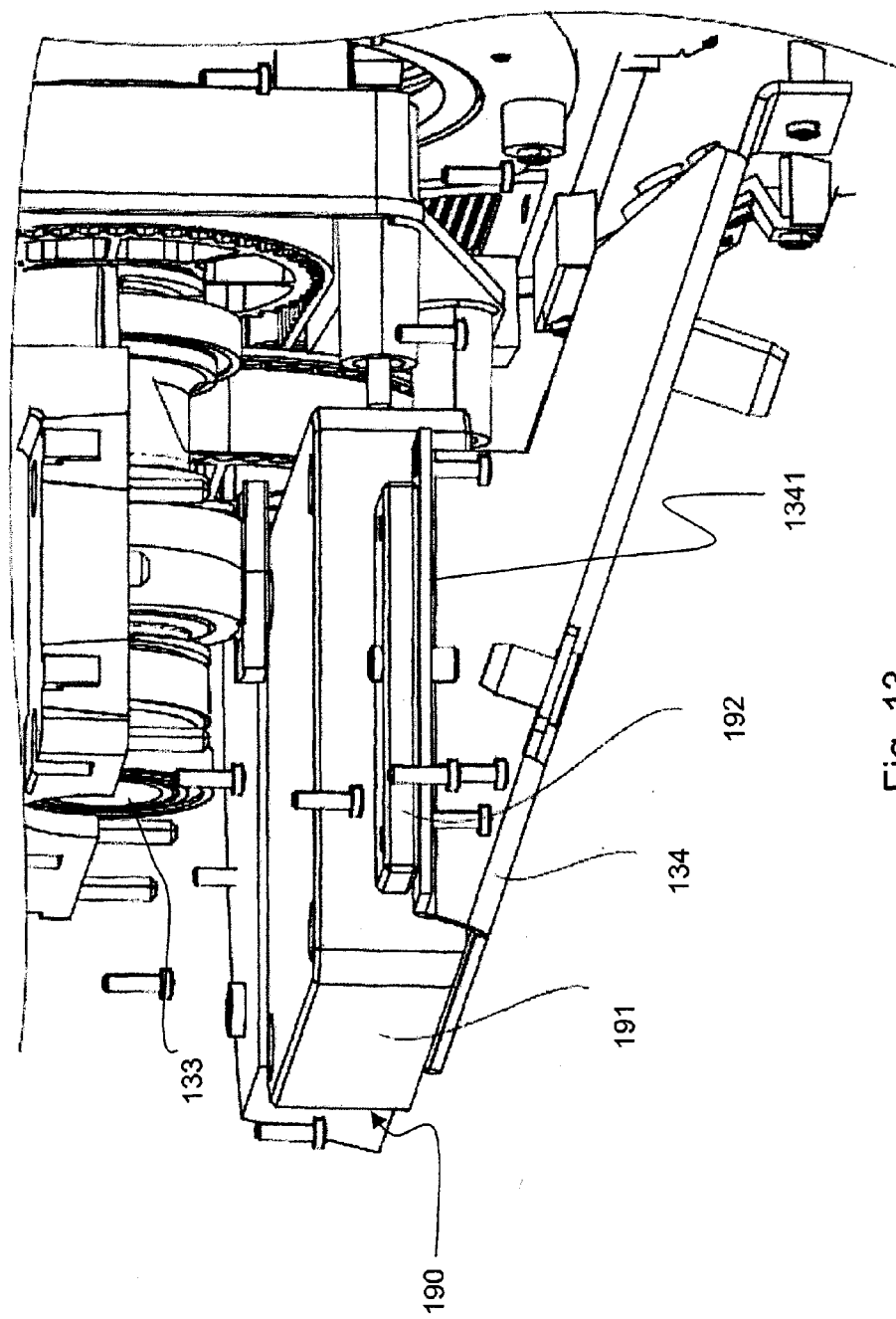

DIRECTIONAL GAME CONTROLLER

RELATED APPLICATIONS

This Application is a continuation of U.S. application Ser. No. 13/090,052, filed Apr. 19, 2011 entitled "DIRECTIONAL GAME CONTROLLER." This Application also claims the benefit of the earlier filing dates of French Application No. 1058873, filed Oct. 27, 2010, French Application No. 1053757 filed May 21, 2010, and French Application No. 1052966 filed Apr. 19, 2010.

FIELD OF THE INVENTION

The field of the invention is that of equipment and accessories for interactive leisure activities for microcomputers and game consoles. More precisely, the invention relates to a game controller (for entertainment programmes, or for programmes for the simulation, learning of the driving or piloting of vehicles, or for educational games for adults ("serious games"), etc.) comprising an element mobile in rotation in relation to a steering support carried by a base. This can for example be a steering wheel, handlebars, or any other element that can be used in a simulation game, in particular to control the displacements of a vehicle. Certain programmes or software indeed implement a simulated vehicle which moves about in a simulated environment. The reproduction of the simulated vehicle can be a true reproduction of an actual vehicle, but it can also be only inspired from an actual vehicle, or be without any link to reality.

PRIOR ART

It is known to use, in order to control video games, different types of interfaces, in particular in the form of directional handlebars or steering wheels, according to the applications and needs, and generally with the purpose of coming as close as possible to reality. As such for video game simulating the driving of a vehicle, the use of an actuator corresponding in its shape and in its use to the type of vehicle driven renders the simulation more realistic, for example, the use of a steering wheel having the shape and the functions of the steering wheel of a saloon vehicle for a saloon vehicle racing game.

Conventionally, steering column game controllers include at least one graspable part (steering wheel or handlebars, for example) pivotally mounted around an axis in relation to a base allowing the user to vary the trajectory of the simulated vehicle. The measurement of the rotation of the graspable part is generally carried out by a potentiometric sensor whereon acts the part mobile in rotation.

Steering controllers for video games with potentiometric sensor have several disadvantages, in particular a lack of precision in the measurement of the angle and a mechanical play of the potentiometer when the steering column is in the vicinity of the neutral position (which generates a central dead zone). They are also subjected to dust and fouling.

Furthermore, potentiometric sensors sometimes have an insufficient lifespan. Due to the wear of the potentiometers, the steering controller can lose its calibration, and even cease to operate. However, steering controllers must support substantial forces (the user sometimes presses against them), and the fragility of the potentiometric sensors requires that they be protected so that the forces are not applied directly on them (which increases the cost and alters the feeling of the user).

Finally, in the case of a steering controller for car games, the use of a potentiometer has the disadvantage of limiting the number of revolutions(s) that the steering wheel can accomplish which is detrimental in particular when it is desired to simulate the execution of manoeuvres (for example, performing a U-turn in a simulated car).

Another disadvantage of most steering column video game controllers is that the rotation of the steering controller is too soft, hardly realistic, and this hinders in particular the user who needs to exert accessorial actions on the actuator (for example, actuate the speed, the brake or the clutch, turn the head of the driver of the simulated vehicle) without changing direction involuntarily.

Another disadvantage of most steering column game controllers is that they are dedicated to the simulation of a single type of vehicle, and that it is therefore required to provide several separate controllers, if one desires to use several programmes (for example an automobile racing simulator, a motorcycle racing simulator and a freestyle cycling simulator). The graspable part of the game controller is suitable at best to the same type of simulated vehicle. It is not satisfactory to control for example, the acceleration of a motorcycle by means of a button placed on a steering wheel. And, controlling the trajectory of a Formula 1 by means of motorcycle handlebars is in no way a realistic simulation. As for simulation enthusiasts, only a quasi-exact replica of the graspable part of their favourite actual vehicle will be suitable.

Beyond the graspable part which is adapted, at best, to one type of simulated vehicle, the rest of the steering controller is not sufficiently robust (especially for off-road motorcycle simulations) to be suitable for several types of simulated vehicles, therefore for interfaces of varied forms and in the case in particular with handlebars, allow the user to press on the game controller and to use both hands (one hand on each side of the handlebars), his fingers for specific actions on the actuator (for example, to actuate the brakes or the clutch on the handlebars), and his wrists (for example, to turn an acceleration thumbwheel on the handlebars). In particular, for most steering controllers, the potentiometric sensor, the fixed part and/or the link between the fixed part and the graspable part of the controller are not sufficiently robust.

OBJECTIVES OF THE INVENTION

The invention has in particular for objective to overcome these disadvantages of prior art.

More precisely, the invention has for objective to provide a steering column game controller increasing the realism of the game, and therefore the precision and the adaptation to a given game, in particular for vehicle driving simulations.

Another objective of the invention is to provide, according to at least one embodiment, a steering column game controller provided with a long lifespan and good resistance to the forces exerted by the user.

The invention further has for objective, according to at least one embodiment, to render the steering column game controller easier to store and to transport. Another objective of the invention according to this aspect, is to provide a steering column game controller which is simple (comprising few parts) and easy to assemble. Another objective of the invention according to this aspect, is to provide a steering column game controller of which the after-sales service and recycling are facilitated.

Another objective of the invention is to provide such a steering column game controller, making it possible simply and effectively, according to at least one embodiment, to use different software, that implements for example different vehicles.

SUMMARY OF THE INVENTION

These objectives, as well as others which shall appear in what follows, are achieved using a game controller having an actuator mobile in rotation in relation to a fixed part, in such a way as to simulate a control of the rotation of a steering column of a simulated vehicle.

In other terms, this entails a directional game controller that simulates steering members of a simulated vehicle that have a steering column. This steering controller, capable of generating output signals, comprises a fixed part and an actuator that simulates the graspable part of these steering members and which cooperates with a steering column which is mobile in rotation in relation to the fixed part. Note that the fixed part can be mobile in relation to the floor or to the support whereon the game controller is fixed or positioned.

According to the invention, said controller implements means for detecting the displacement in rotation of said actuator comprising at least one Hall effect or magnetoresistive effect detecting unit (including, but not limited to, the giant magnetoresistive effect), constituted of at least two elements, of which a permanent magnet and a magnetic sensor, provided in such a way that, at least during the rotation of said actuator, a first of said elements is integral in rotation with said actuator and a second of said elements is integral in rotation with said fixed part.

As such, the measurement of the angle of rotation of the actuator in relation to the fixed part can be carried out more precisely than with potentiometric sensors. The absence of a potentiometric sensor confers improved longevity and reliability to game controller. The forces exerted by the user are not transmitted to a potentiometric sensor, but to a steering column of the controller, or shaft, which is dimensioned in order to support substantial forces. The controller therefore offers a realistic feeling to the user (or player).

The measurement of the angle of rotation of the actuator in relation to the fixed part can as such be carried out without contact between the magnet and the magnetic sensor. As magnetic fields pass through many materials, this measurement can be carried out even if material is placed between the magnet and the magnetic sensor. The magnetic sensor can as such, where applicable, be protected by a casing of the actuator constituted, for example, of plastic.

The absence of contact limits the risks of wear and of fouling, and can allow, in certain embodiments, for an easy disassembly of the actuator, and where applicable its immediate interchangeability, if several different actuators are available.

In certain embodiments, it further makes it possible to provide a controller in at least two parts or modules that can be separated. The "actuator" module can be sold separately from the "fixed part" module. This facilitates storage: as the modules are separable, they can be separated and arranged together in a box of a smaller volume than when the controller is constituted of elements that cannot be separated. This allows for the realisation of economies of scale on the manufacturing of a fixed "part" module that is common to several controllers. This also facilitates transport and storage, since the modules can be transported or stored independently. This finally facilitates after-sales service since if one module is defective, it is not necessary to return the entire controller to the seller or to the manufacturer.

It is also possible in certain embodiments to provide a controller in at least two modules (or sub-units) that can be separated of which one module does not contain any electrical element. Providing the electrical elements all grouped together in at least one module and providing in at least one other module the non-electrical elements (for example the module comprising the steering column and the base) further facilitates the after-sales service as the electrical failures can easily be distinguished from mechanical failures, the after-sales service (return, exchange, etc.) can therefore be applied solely to the defective module. This further facilitates the recycling of the controller as the non-electrical module or modules can be recycled and valorised in separate recycling units.

Even in the case where the actuator can be removed only from the fixed part, for example by an operator of a recycling unit (for example, by unscrewing one or several screws), it remains desirable, for the reasons indicated previously, to provide a controller constituted of at least two parts or sub-units that can be removed from one another, of which at least one sub-unit contains no electrical element.

According to a particular embodiment of the invention, the elements comprising the Hall effect detecting unit are aligned according to the axis of rotation of said actuator.

It enables to use a smaller and/or less "strong" magnet. It also enables to use only one sensor and one magnet and it eases the development of the controller (this is particularly important in the case of an actuator which can be detached from the fixed part) and it facilitates the demounting of the controller.

In a particular embodiment, the controller implements two separate detection units, i.e. a first sensor located in the actuator cooperating with a magnet placed in the vicinity of the steering column, and a second sensor placed across from the motor dynamising the steering column in rotation (and where applicable in translation).

According to a particular embodiment, the magnet of the Hall effect detecting unit is integral with the fixed part.

Said magnet can be integral with the fixed part by the intermediary of a first fixed shaft in relation to the fixed part of the controller, this first fixed shaft extending according to the axis of rotation of the actuator and carrying this magnet.

It reduces the distance between the sensor and the magnet (s) (this is important because the density of the magnetic flux decreases with the distance).

In particular, this first shaft can be a cylindrical magnet carrier rod and the magnet can be a round magnet mounted at the end of the rod.

According to a particular embodiment of the invention, a second shaft mobile in rotation in relation to the fixed part of the controller according to the axis of rotation of the actuator, can provide the guiding of said round magnet in relation to said magnetic sensor.

It also provides more sturdiness (this is important because the controller may be used for a freestyle motorcycling and freestyle motocross simulations, as a consequence, both the actuator (handlebars) and the steering column will suffer great forces which are higher than forces which are incurred for example during a racing car simulation).

It can as such in particular be provided that the first fixed shaft and/or the magnet are shaped in such a way that the magnet is placed less than 9 mm from the magnetic sensor.

According to another particular embodiment of the invention, the means for displacement in rotation of the actuator include a rotary electric motor acting on the actuator by the intermediary of means for transmitting belonging to the group comprising gears, pulleys, toothed wheels, belts and chains.

In this embodiment, the game controller is not only capable of generating output signals, but also receiving input signals which correspond, for example, to commands (execution of a torque effect, of a vibration effect, etc.) or to data (data coming from for example, a pedal assembly and/or from a gearbox separate from the steering wheel) or to a particular operating mode of the controller (calibrating, demonstration, energy savings, etc.).

The controller implements means for detecting the displacement in rotation of the actuator comprising at least one Hall effect or magnetoresistive effect detecting unit (including, but not limited to, the giant magnetoresistive effect).

In particular, the magnet is integral with the rotation shaft of the rotary electric motor, the magnetic sensor being located in the vicinity of the magnet substantially in the extension of the shaft of the rotary electric motor. Consequently, said sensor and said magnet are substantially aligned according to the axis of rotation of said motor.

The measurement of the angle of rotation of the actuator in relation to the fixed part can as such be carried out without contact between the magnet and the magnetic sensor.

This implementation offers a precision much superior to what exists in the field of the video games. Furthermore it does not limit the number of revolutions that the steering column can make.

According to a particular embodiment, the game controller comprises means for displacement in translation of the actuator in relation to the fixed part over a predetermined range of displacement.

As such, the actuator is mounted mobile in translation in relation to said frame which is fixed (in this sense that it constitutes a reference base of the game controller), over a predetermined range of displacement. The control of the displacement in translation of the actuator can be provided by a linear electric motor constituted, for example, of an assembly of at least two sliding parts sliding in relation to one another, one of the sliding parts being integral with the actuator and another of the sliding parts being integral with the fixed frame, a first of the sliding parts comprising at least one slot wherein can be displaced at least one penetrating portion of the second of the sliding parts. The displacement in translation is generated by electromagnetic means according to an electric signal of which the characteristics vary according to a command received (said command can be, for example, a displacement instruction of the ramp or sinus type, or an instruction of the neutral position maintaining type), a first of the sliding parts being integral with at least one winding travelled through by the electric signal and a second of the sliding parts being integral with at least one magnet.

As such, the steering column is dynamised:
in translation by a force feedback and/or vibration system by means, for example, of an electromagnetic device acting on the steering column by the intermediary of an assembly of two sliding parts, of which a base mobile in translation whereon is mounted in rotation the column, the displacement in translation of the base being controlled by electromagnetic means; and, in at least one embodiment,
in rotation by a torque and vibration effect system by means, for example, of a rotary electric motor acting on the steering column by the intermediary of a system of toothed belts and gears.

As underlined beforehand, the control of the displacement in rotation of the actuator can be provided by a rotary electric motor. The displacement in rotation is generated by this rotary electric motor according to an electric signal of which the characteristics vary according to a command received (said command can be, for example, a displacement instruction of the ramp or sinus type, or an instruction of the neutral position maintaining type). Means for processing, in the form of a microprocessor, control said electric signal and control and such the direction, the amplitude (for example, the angle of rotation of the rotary electric motor) and the speed of said displacement.

Many force feedback effects are possible, for example: inertia, spring, blocking, acceleration, abrupt movement (impact), etc.

Different vibration effects are also possible, they can in particular differ according to their amplitudes, durations, and periods.

The programmer of the game software chooses the force feedback effect or effects to be applied according to the scenario of the game (for example: the scenario provides for a section of ice-covered road, a body of water to be crossed, etc.) and actions of the user on the game (for example, the user did not slow down or not enough). The game requires the execution of the force feedback effect or effects and/or vibration effect selected by the programmer for such a case from a library of force feedback effects and vibrations.

Such a game controller can as such convert mechanical parameters coming from the software into forces applied to the steering column, and therefore to the steering wheel, according to two axes.

As such, in addition to the conventional system of torque and vibration effects applied on the rotation of the column (and therefore of the steering wheel or of the handlebars), simultaneous implementation is carried out of at least one force feedback applied on the translation of the column by electromagnetic means in such a way as to simulate, in particular, acceleration or deceleration effects and a suspension effect.

In other terms, the controller of the invention actuates the steering column in rotation and in translation offering as such a realistic feeling to the user.

According to a particular embodiment of the invention, the actuator can be detachable from the fixed part of the game controller.

Said actuator can include a housing forming a female part, provided to nest on a corresponding male part on the fixed part.

According to a particular embodiment, the game controller provides means for locking the actuator onto the fixed part.

According to a particular aspect, the actuator comprises a connector whereon a cable can be connected.

According to a particular embodiment, the actuator belongs to the group comprising:
The steering wheels;
The handlebars;
The ship helm.

In a particular embodiment, it can be provided that the game controller comprises or is compatible with at least two interchangeable actuators.

It can in particular be provided that said interchangeable actuators have characteristics procuring different ergonomics for the user.

This difference in ergonomics can in particular come from an actuator that can have different forms, different diameters, different commands (for example, different buttons, an acceleration thumbwheel and no control paddle, etc.), be wired or wireless, etc.

According to a particular aspect of the invention said interchangeable actuators can have magnetic sensors or different magnets, in such a way as to obtain different restored effects, a different resolution (more or less precise measurements of displacement), and/or a resistance that is more or less strong to magnetic disturbances or to temperature variations, etc.

According to a particular embodiment of the invention, the controller is constituted of at least two parts (for example, a fixed part and a mobile "actuator" part), of which one at least (more preferably, the fixed part) does not contain any element that operates thanks to electric currents or to electromagnetic fields.

In particular, the game controller can be comprised of several modules assembled by the user, said modules being themselves comprised of elements provided preassembled to the user, at least one of said modules containing no element that implements electric currents or electromagnetic fields nor any element that controls or that carries electric currents.

In a particular embodiment of the invention, a portion of the actuator used as a casing for it can protect the magnetic sensor.

The invention further relates to the actuator mobile in rotation in relation to a fixed part, in such a way as to simulate a control of the rotation of a steering column, intended for a game controller.

Likewise, the invention also relates to the fixed part intended to form, with an actuator mobile in rotation in relation to this fixed part, a game controller.

Instead of a magnetic sensor counting the number of revolutions of one or more magnets (by sensing a number of magnetic pole inversions), it is here preferably another kind of magnetic sensor, a multiaxis sensor (for example, 2D or 3D) which will sense the features of the magnetic field of one or more magnets (by measuring the rotation of the magnetic field i.e. the flux densities) according at least two directions. An algorithm is used in order to get angular values from the measures and to determine the sign—direction of rotation—(and then it is possible to calculate the speed and the acceleration or deceleration). This approach provides an accuracy which is far higher than the accuracy of the video game domain prior art.

In an alternative, no intermediary mean for transmitting displacement in rotation (i.e. no gear, pulley, toothed wheel, belt and/or chain) is used. Accordingly, the rotary electric motor (for torque and/or vibration effects) is directly linked to the steering column (the rotary electric motor may be in part a part of the steering column) and is acting on the actuator (via the steering column and, as the case may be via a linking part or system which enables to detach the actuator from the steering column).

In another alternative, the rotary electric motor (for torque and/or vibration effects) and the linear electric motor (for force feedback and/or vibration effects) may both be placed in the actuator. It enables a controller which provides both torque and/or vibration effects and force feedback and/or vibration effects while its fixed part does not contain any element that implements electric currents or electromagnetic fields nor any element that controls or that carries electric currents.

BRIEF DESCRIPTION OF THE DRAWINGS

Other characteristics and advantages of the invention shall appear more clearly when reading the following description of two preferred embodiments, provided as simple and non-restrictive examples, and of the annexed drawings, wherein:

FIGS. 10A and 10B are respectively bottom and front views of the system of fastening of the controller of FIG. 7;

FIG. 13 is a detailed view of means for force feedback in translation of the actuator of the controller of FIG. 7.

DETAILED DESCRIPTION

1. General Principle and Alternatives

Figure 1:
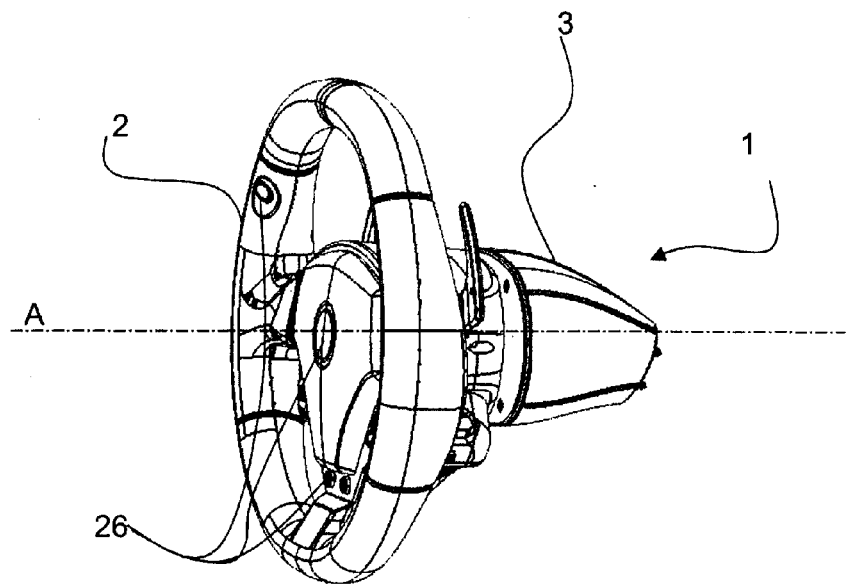
FIG. 1 is a view in perspective of the game controller according to a first preferred embodiment of the invention, and more precisely of an example of a steering wheel controller for the control in particular of a video game.

The actuators of game directional controllers are generally handlebars or steering wheels of which the angle of rotation in relation to the base is measured by the intermediary of a potentiometer. Other types of actuators can of course be considered, for example in order to simulate the control of a boat, of a space vessel, etc.

The invention proposes to use a magnetic sensor and permanent magnet detection unit to measure the displacement in rotation, and where applicable in translation, of the actuator in relation to the fixed part of the game controller, in such a way as to avoid any contact between the means for measuring, and to obtain good precision. Note that such a detection unit can measure not only the angle of rotation of the actuator, but also the speed and the direction of rotation of the actuator. In what follows, systems based on the Hall effect shall be described. The same approaches can however be implemented with systems based on the magnetoresistive effect in particular, but not limited to, the giant magnetoresistive effect.

Many implementations of the invention can be considered. A few examples are proposed hereinafter.

1.1 Alternative 1

In a first preferred embodiment, the magnetic sensor can be mounted mobile in relation to the fixed part, more precisely it can be integral with the actuator (including a part integral with the actuator) when the actuator pivots around the axis A. For example, the magnetic sensor can be placed on a PCB fixed in the actuator. The magnet can be mounted integral with the fixed part when the actuator pivots around the axis A. For example, the magnet can be mounted on a part fixed to the fixed part, this part can be a shaft (a shaft is not necessarily cylindrical or tubular) extending according to the axis A.

1.2 Alternative 1 Bis

In another example, this magnetic sensor (here mobile) can also be mounted in the fixed part, more precisely it can be integral with a linking part pivotally mounted on the fixed part, said linking part being intended to cooperate with an additional cavity of the actuator and a permanent magnet being integral with the fixed part of the controller. In this embodiment, the magnetic sensor is not in the actuator (i.e. it is not in the graspable part of the controller) but in the fixed part. When the actuator is assembled—in a removable or non-removable manner—to the linking part, the magnetic sensor which is fixed to the linking part becomes integral in rotation with the actuator. The angle of rotation of the actuator is identical to the angle of rotation of the linking part and the magnetic sensor interacts with the permanent magnet which is fixed in relation to the actuator.

1.3 Alternative 1 Ter

In another example, the magnet can be placed in a part mobile in rotation in relation to the fixed part (for example, in the actuator or in a linking part, but mobile in rotation in relation to the actuator by mounting the magnet on a roller bearing) and the locking of the actuator to the fixed part at the same time blocks the magnet which can no longer turn in relation to the fixed part while still allowing for the rotation of the actuator in relation to the fixed part. The magnetic sensor is integral in rotation with the actuator (for example, it is in the actuator or in a part integral with the actuator when the actuator pivots in relation to the fixed part).

1.4 Alternative 2

In a second embodiment, the magnetic sensor can be mounted fixed in relation to the fixed part, more precisely it can be integral with the fixed part (including a part fixed in relation to the fixed part even when the actuator pivots around the axis A) when the actuator pivots around the axis A. For example, the magnetic sensor can be fixed in the fixed part. The magnet can be mounted integral with the actuator when the actuator pivots around the axis A. For example, the magnet can be fixed to the actuator or mounted on a fixed part—in a permanent or non-permanent manner—to the actuator.

In another example, the magnet integral in rotation with the actuator, and therefore mobile in relation to the fixed part is carried by a movable shaft (including a rod) which is integral with the actuator (including a linking part mobile in rotation around the axis A in relation to the fixed part) and which carries this magnet to the magnetic sensor. The magnetic sensor is then fixed to the fixed part.

2. Detailed Description of a First Preferred Embodiment

In the first preferred embodiment described in what follows, the actuator is a steering wheel (type steering wheel type of a saloon car) that can be detached from the fixed part. A permanent magnet is placed on the fixed part of the controller and a rotating biaxial (2D) Hall effect magnetic sensor in the steering wheel. The use of a Hall effect detecting unit, comprising at least two elements, of which a permanent magnet and a magnetic sensor, makes it possible to avoid the passing of an electric cable between the actuator and the fixed part (in the case of an actuator that cannot be separated from the fixed part) or to avoid an electric connector between the actuator and the linking part (the presence of a connector on the link between the actuator and the fixed part has in particular the disadvantage of generating a weakness as the connector is solicited at each release and taking of the actuator that can be detached).

In other embodiments, the magnet and the sensor can be inverted. Moreover, although the use of a single magnet and of a single sensor is advantageous, in particular in a position wherein they are aligned with the steering column, it can be considered to use several magnets and/or sensors distributed adequately.

Furthermore, in other embodiments, it can be considered that the Hall effect magnetic sensor may be a Hall effect 3D magnetic sensor.

FIG. 1 is therefore a perspective view of an example of a game controller according to the invention. This controller 1 comprises an actuator 2, in the form of a steering wheel mobile in rotation in relation to a fixed part 3 according to an axis A of rotation.

In this figure in particular can be distinguished control paddles 25 and buttons 26 arranged on the actuator.

Figure 2:
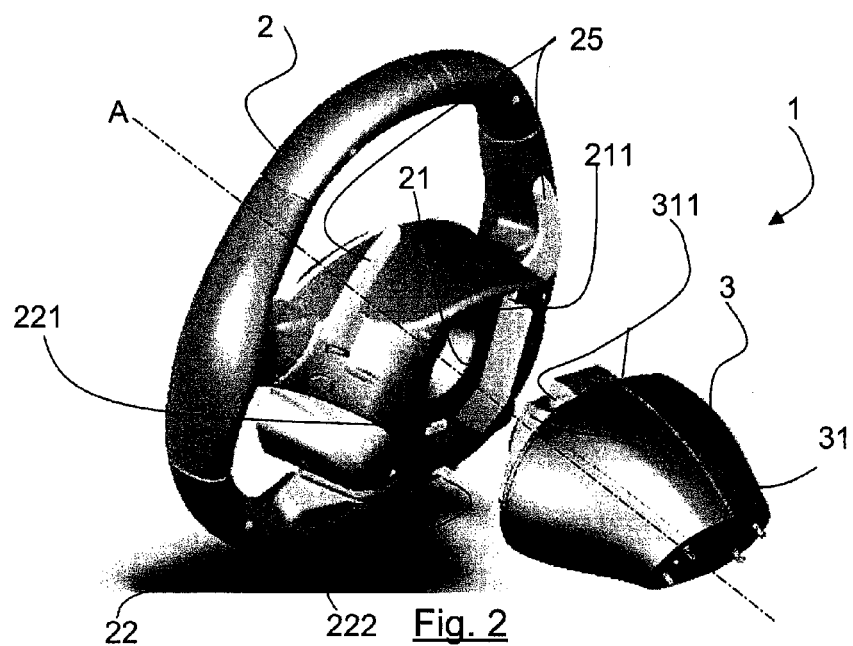
FIG. 2 is a view in perspective of the game controller of FIG. 1, the detachable actuator separated from the fixed part.

According to the embodiment of the example, FIG. 2 shows via a perspective view the actuator 2, once separated from the fixed part 3.

In order to assemble the actuator 2 with the fixed part 3, a linking part 31, pivotally mounted on the fixed part 3, is intended to cooperate with an additional cavity 21 of the actuator 2. The forms of the cavity 21 and of the linking part 31 are adjusted and make possible (when these two parts cooperate) the transmission of the rotating movement of the actuator 2 to the linking part 31.

The controller comprises a system of fastening which makes it possible to fix and to lock reversibly the actuator 2 onto a linking part 31. The system of fastening comprises, in this embodiment, an axis 311 arranged on the linking part 31. This axis 311 is intended to position itself in a housing 211 located in the cavity 21. The system of fastening further comprises a locking latch 22 arranged on the actuator 2. This latch is formed of a an upper part 221 which is provided to position itself in a cavity 312 (which can be seen in FIG. 4) on the linking part 31, and of a lower part 222 allowing the user actuate this latch 22 when he wants to separate the actuator 2 from the fixed part 3.

Many other reversible or non-reversible means of fastening can of course be implemented, without leaving the scope of the invention, including a simple nesting by force of the steering wheel on the steering column 33, in a simplified embodiment.

Figure 3:
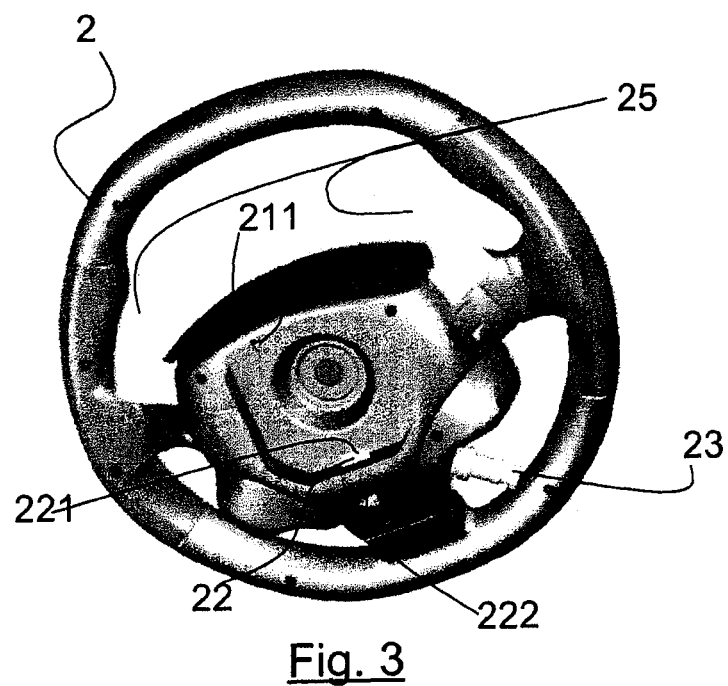
FIG. 3 is a view in perspective of the actuator of the game controller of FIG. 1.

FIG. 3 is a view in perspective of the actuator 2 seen from below. This figure shows in particular a connector 23 whereon a cable can be connected, for the supply of electrical energy and/or data transmission (for example, information on the rotation of the actuator 2, and where applicable additional information, such as a speed change command, when the user acts on the paddles 25, or other commands triggered by the activation of the buttons 26 (which can be seen in FIG. 1) located on the actuator 2).

In another embodiment, the transmission of the data can be done wirelessly, via a radio frequency transmitter (for example, 2.4 GHz) placed in the actuator 2; the supply of electrical energy then being provided by one or several batteries or accumulators placed in a case arranged in the actuator 2 or in a case that can be detached and that can be connected to the actuator 2.

Figure 4:
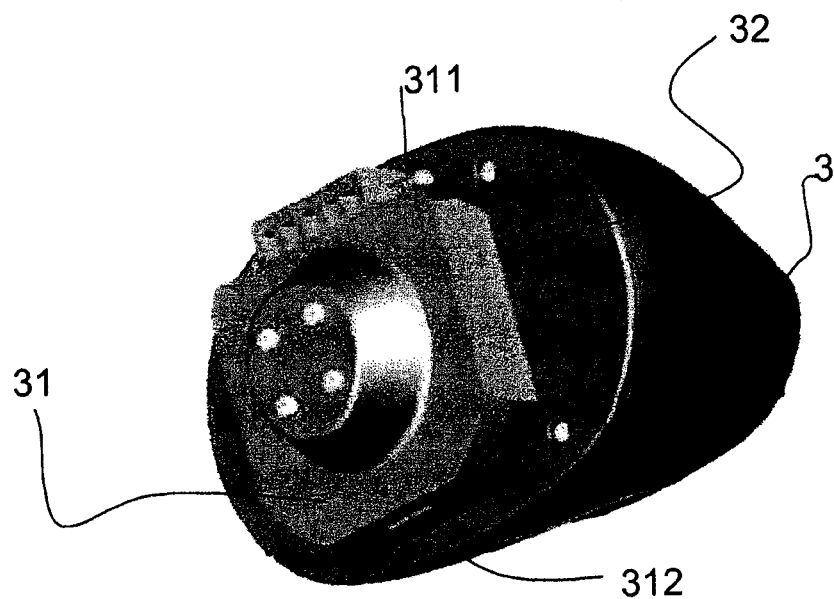
FIG. 4 is a view in perspective of the fixed part of the game controller of FIG. 1.

FIG. 4 is a view in perspective of the fixed part 3. In particular can be distinguished, at the front end of the fixed part 3, the linking part 31 making it possible to carry out the interface between the actuator 2 and the fixed part 3. This linking part 31 is mobile in rotation in relation to base 32, according to the axis A and makes it possible to transmit to the steering column of the controller 1, which in this embodiment is the shaft 33 (which can be seen in FIG. 5), the rotating movement exerted by the user on the actuator 2 and to a system for dynamisation and/or return of the steering wheel to neutral position (or centre return system), detailed herein below.

Figure 5:
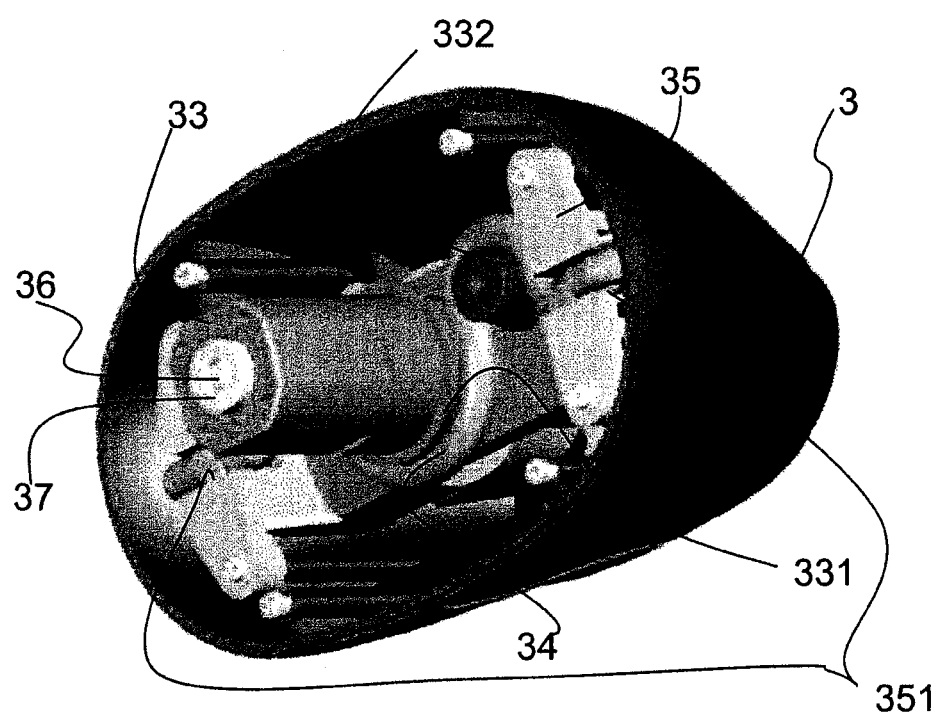
FIG. 5 is a view in perspective of the inside of the fixed part of FIG. 1.

FIG. 5 is a view in perspective of the inside of the fixed part 3 showing in particular the centre return system (via an elastic in this embodiment).

In this embodiment, the shaft 33 is designed in such a way that it constitutes the main axis of rotation of the controller 1 (which can therefore be qualified as a steering column of the controller 1), and in that it also constitutes a part of the centre return system of the actuator 2. The shaft 33 is formed from a single part but it could be formed from several parts fixed together (for example, a shaft and a return part whereon the forces for returning to the centre are executed). The shaft 33 (or steering column 33) is mounted pivotingly around the axis A in relation to the support of the rotation mechanism 35, with the latter being fixed to the fixed part 3. The base 32 and the support of the rotation mechanism 35 provide the guiding in rotation of the steering column 33. The steering column 33 is integral in rotation with the linking part 31, and therefore with the actuator 2, and therefore is displaced in rotation in the same manner as the actuator.

A fixed shaft 36 is fixed to the support of the rotation mechanism 35 (it is, for example, nested by force into the support of the rotation mechanism) and extends along the axis A to approach the magnet as close as possible to the magnetic sensor. The magnet is in this embodiment a round magnet 37. The steering column 33 comprises an inside tubular space wherein penetrates the fixed shaft 36 and the round magnet 37.

The circulation section of the space inside the steering column 33 is consequently complementary with the circulation section of the round magnet 37. The steering column 33 therefore guides the round magnet 37 and recentres this magnet in relation to the axis A. This balances the mechanics and allows for an improvement in the precision of the measurement of the rotation (by avoiding an unbalance, an imbalance of the magnet, a bending of the shaft 36). The measurement remains precise even in the case of bending of the steering column 33.

In an alternative, the round magnet is placed on a fixed shaft 36, and the shape of this magnet completes the guiding in rotation of the actuator 2 around the axis A, by guiding the rotation of the steering column 33.

In another alternative, the fixed shaft 36 provides the guiding in rotation of the steering column 33 and therefore of the actuator 2 around the axis A. A rounded form of the magnet does not procure any advantage then and the form of the magnet can therefore be different (for example, a bar magnet can be fixed to the end of a housing arranged at the end of the shaft 36).

Figure 6:
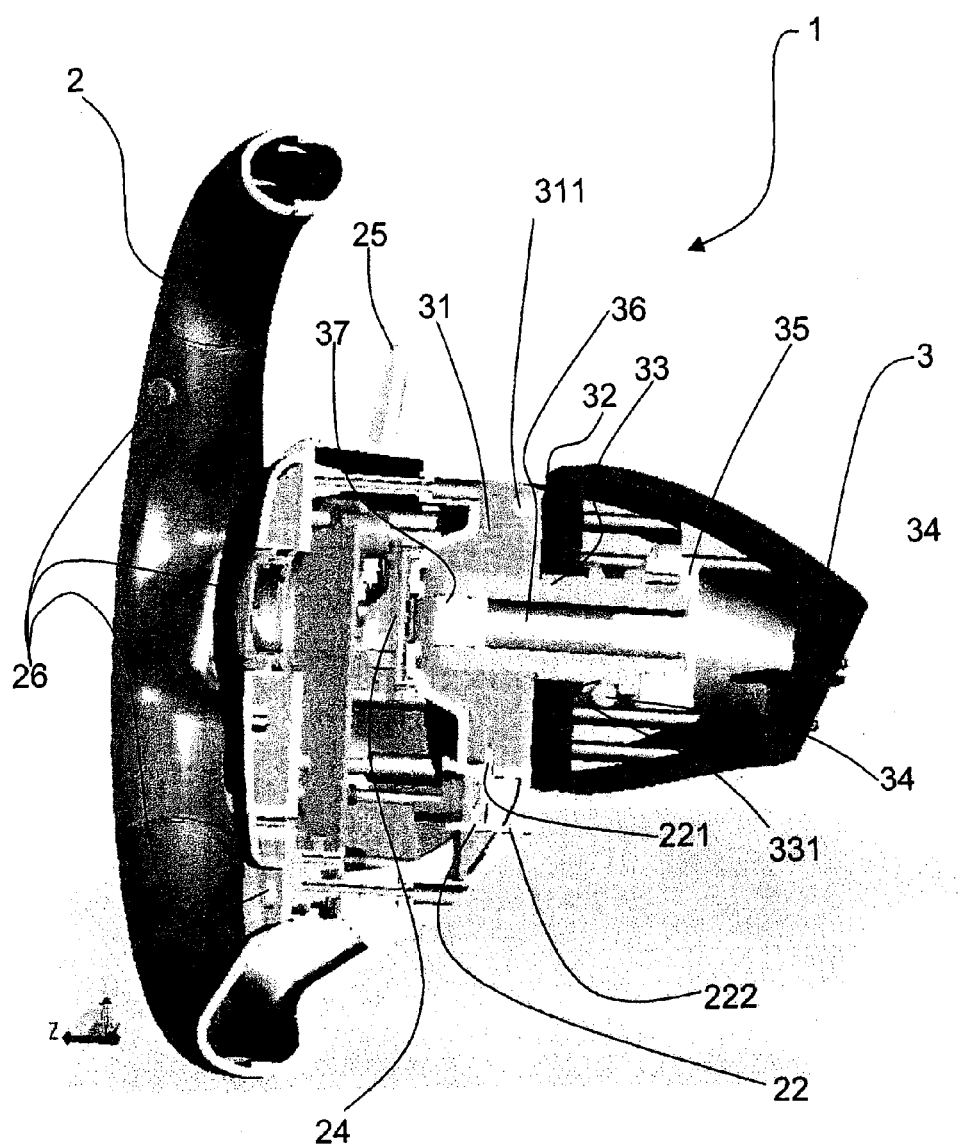
FIG. 6 is a cross-section view of the controller of FIG. 1.

In the embodiment shown in FIGS. 5 and 6, the steering column 33 is mobile in rotation in relation to the fixed part and to the base 32, and the shaft 36 is fixed in relation to the fixed part 3. This approach can be inverted. The shaft 33 can be fixed in relation to the fixed part 3 and to the base 32. The shaft 36 is then mobile in rotation in relation to the fixed part 3. The shaft 33 provides the guiding in rotation. The linking part could cooperate with the end of the shaft 36 and the actuator 2 (and provides a non-definitive link between them). The rotation of the actuator causes the rotation of the shaft 36. The magnet can be fixed in relation to the fixed part 3. For example, a round magnet can be nested by force into the shaft 33. The shaft 36 is mobile in rotation in the round magnet (the round magnet then would contribute in part to the guiding in rotation). The PCB carrying the magnetic sensor 24 is then mobile in relation to the fixed part 3.

As an alternative to this inverted approach, the round magnet could be fitted by force around the shaft 33 instead of being nested by force in the shaft 33 (the shaft 33 being fixed as we are in the inverted approach).

As a second alternative to this inverted approach, instead of being a round magnet nested by force in the shaft 33, the magnet can be a bar magnet of a length less than the diameter of a cylindrical shaft 36 which could be nested by force—without exceeding radially—in a slot arranged in the end of such a shaft 36 (in this case the shaft 33 is no longer required, the guiding in rotation then able to be provided directly by the base 32 of the fixed part 3, and the diameter of the shaft 36 can be greater).

In the first preferred embodiment shown in FIGS. 5 and 6, the steering column 33 comprises a first pulley, or a portion of a pulley, 331, centred on the axis A, and two short shafts substantially parallel to the axis A and which each carry a small return pulley 332 (only one can be seen in FIG. 5, the other being mounted symmetrically). These pulleys 331 and 332 guide an elastic cord 34 of which the ends are anchored to the support of the rotation mechanism 35 fixed to the fixed part 3, on two grooves 351.

The axis of each of the pulleys 332 is integral with the steering column 33. The pulleys 332 can more preferably turn around their axis. The ends of the elastic cord 34 are not fixed to the support of the rotation mechanism 35, they are simply anchored, maintained integral with the support of the rotation mechanism 35 by the pre-compressing of the elastic cord. Indeed, each end of the elastic cord 34 is attached to a spool (a part in the shape of a sewing spool, i.e. a sort of pulley without an axis of rotation).

This spool thrusts itself against the support of the rotation mechanism 35 (the height of the spool does not allow it to cross over the groove 351) but with the reserve of having first removed the fixed part 3 (or before having screwed the linking part 31 to the steering column 33, the base 32 to the fixed part 3 and the support of the rotation mechanism 35 to the fixed part 3), it is possible to radially pull on the spool (by opposing the elastic force) in order to remove the spool from the support of the rotation mechanism 35 by stretching the elastic beyond the groove 351. This makes it possible to remove the elastic cord 34 from the centre return system, then remove the steering column 33 from the support of the rotation mechanism 35.

The elastic cord 34 exerts, when the actuator 2 is displaced, a retaining force which tends to return the pulleys 332 and therefore the steering column 33 and the actuator 2, to a neutral position (corresponding, in the case where a car is simulated, to a position of the wheels aligned with the simulated vehicle). The friction of the elastic cord 34 makes it possible to simulate a resistance in the steering. The elastic cord 34 exerts in particular a substantially vertical resultant force on the pulley 331, which supports the steering column which improves the quality perceived by the user.

In another embodiment, the neutral return system of the steering wheel can use two extension springs having identical characteristics acting on either side of the steering column instead of an elastic cord and pulleys. In the neutral position of the actuator, the two extension springs are slightly pre-compressed. When the actuator 2 is displaced, each of the two springs exerts a retaining force which tends to return the steering column and the actuator to neutral position.

In yet another embodiment, the neutral return system (or return to the centre) of the steering wheel is even more simple: a torsion spring of which the inside diameter of the spires is slightly greater than the outside diameter of the steering column is placed around the steering column. This torsion spring cooperates with a lug arranged on the internal face of the part 32 of the base. This spring comprises only a few spires and, in final position, the branches of this spring are at three hundred sixty degrees (i.e. substantially parallel). In the neutral position of the actuator, the spring is slightly pre-compressed and the two branches of this torsion spring press against the lug. When the actuator 2 is displaced, one of the branches of the spring moves away from the lug and a retaining force tends to return this branch against the lug and therefore the steering column and the actuator to neutral position.

In a particular embodiment, the rotation of the steering column 33 is dynamised by a force feedback system by means, for example, of a rotary electric motor acting on the steering column by the intermediary of a system of toothed belts and gears. In this case, a gear of large diameter (for the precision) is fixed coaxially to the steering column 33. This gear receives mechanically (via a train of gears and/or toothed belts and wheels) the forces exerted by the electric motor which is actuated according to the force feedback effect implemented by a programme (for example, a video game). The gear, and therefore the steering column 33 and the actuator 2, pivots or stops its rotation around the axis A under the action of the electric motor, for example, it can return the actuator 2 to neutral position, or oppose the rotation of the steering column 33, cause the rotation of the steering column 33, cause shakes in the rotation of the steering column 33, etc.

The FIG. 5 clearly shows the round magnet 37. As indicated hereinabove, the form of the round magnet 37 makes it possible to guide it in relation to the steering column 33, i.e. to maintain it coaxial with the axis A. It is placed at the top of the shaft 36, and can therefore be located in the immediate vicinity (for example less than 9 mm) of the Hall effect magnetic sensor 24 placed in the actuator 2. The shaft 36 thus constitutes in this embodiment a magnet carrier rod. Generally, the stronger the magnet, the greater the distance can be between the magnetic sensor and the magnet. In this embodiment, this distance is 8.05 mm.

According to an alternative of this first embodiment of the invention, the magnetic sensor 24 (and where applicable one or other sensors associated for example, to a system for dynamisation of the steering column in translation) provides in real time the data which allows a microprocessor (which can be placed on a PCB located either in the actuator 2, or in the fixed part 3) to control in real time the displacement in rotation of the steering column 33, by determining in real time the actual displacement or displacements (the actual angle can be measured directly but it is also possible to determine the actual direction, acceleration and speed of the displacement).

It is as such possible to take into account the consequences caused by the forces exerted by the user on the actuator 2 (and therefore on the steering column 33) and to adjust the electric signal if required.

For example, if the force feedback effect is an immobility (i.e. an absence of rotating movement of the actuator and of the steering column), the user is likely to fight against this immobility. Then, without control, the steering column 33 is likely to be displaced under the action of the forces exerted by the user despite the electric signal used. In this example, if the sensor 24 measures a change in position while the microprocessor is executing an "immobility" instruction, then the microprocessor can adjust in real time the electric signal in order to counter the forces of the user (for example, by increasing the voltage).

The control of the displacement in rotation therefore includes here the control of the amplitude of the displacement (including a displacement travel of zero), of its direction, of the acceleration and of the speed of displacement, via an electric signal of which the characteristics make it theoretically possible to obtain these displacement parameters, the verification of the actual execution of these parameters and the adjusting of the displacement if required. In this alternative of the first particular embodiment, the displacement is therefore controlled.

In other terms, there are two ways to implement this first particular embodiment of the invention:
  the first, without control, wherein the displacement is controlled in an open loop, without knowing the actual displacement therefore without taking into account whether or not the user exerts forces which affect the displacement (for example, the position or the speed); and
  the second, with control, wherein the actual displacement is measured in real time in order to adjust if required the electric signal (including, for example, the voltage).

In other embodiments, the round magnet 37 can be placed at another fixed location in relation to the fixed part 3. For example, it can be mounted on the base 32 and placed around the mouth of the base 32, i.e. of the opening arranged in this base so that the steering column 33 can exit through the base 32. In this case, the shaft 36 will no longer be necessary and the outside diameter of the steering column 33 could be reduced. And, it is possible to extend the mouth of the base 32 in the direction of the axis A so that it forms a tube that is longer than the short tubular bearing shown in FIG. 6, in such a way that the round magnet is located at the end of this tube and inside the linking part and is as close as possible to the magnetic sensor.

In the first preferred embodiment shown in FIGS. 4 and 5, the fixed part 3 does not comprise any element that operates thanks to electric currents or to electromagnetic fields. Indeed, this fixed part does not comprise any element operating thanks to electric currents or to electromagnetic fields (in particular, there is no electric motor or electronic component). Moreover, in the embodiment shown in FIGS. 4 and 5, the fixed part 3 does not comprise any element that controls or that carries electric currents (in particular, there is no electric connector, electric cable, or electric switch).

FIG. 6 is a cross-section view of the controller. It makes it possible to view the interior of the actuator 2 and the interior of the fixed part 3. The Hall effect magnetic sensor 24, integral with the interior of the actuator 2, is located in the immediate vicinity of the cavity 21 wherein is housed the linking part 31 of the fixed part 3. In this way, the magnetic sensor 24 is located very close to the round magnet 37, which exerts a magnetic field that passes through the linking part 31. Measurements of great precision can therefore be taken.

More precisely, when the user displaces the actuator 2 in rotation, he simultaneously drives in rotation the magnetic sensor 24 in relation to the round magnet 37, which remains fixed since the latter is integral with the support of the rotation mechanism 35 and therefore with the fixed part 3. Therefore the magnetic sensor 24 measures according to at least two directions (so that it gets at least two vector components of the magnetic density flux) a variation in the magnetic field because of the rotary movement of the magnetic sensor in relation to the magnet, which can be transformed into a precise angle of rotation, direction of rotation and speed of rotation, and transmitted to the data processing system executing the game. This rotating movement of the actuator 2 is at the same time applied to the linking part 31, and to the steering column 33 including to the portion or return part carrying the two short shafts and the pulleys 332. The latter then acts, via the elastic cord 34, anchored to the support of the rotation mechanism 35 (therefore to the fixed part 3), in order to generate an elastic retaining force allowing for the return to the centre of the actuator 2, to neutral position, as soon as the user stops exerting a torque thereon.

It is possible to provide a stop integral with the movable shaft 33 and which cooperates with the fixed part (or the support of the rotation mechanism 35) in order to limit the rotation of the shaft 33 in such a way as to prevent a rupture of the elastic cord 34 or prevent the elastic cord from generating a restoring torque that is dangerous for the user.

However, it is also possible to provide, in a particular embodiment, that the actuator can perform a large number of revolutions, and even that the number of revolutions not be limited. This is in particular made possible by the absence of contacts between the actuator 2 and the fixed part 3. This has an interest in particular when it is desired to simulate the execution of manoeuvres (for example, carry out a U-turn in the simulated car).

3. Detailed Description of a Second Preferred Embodiment

In the second preferred embodiment described hereinafter, the game controller implements two force feedback systems each procuring varied effects (sensations of inertia, of blocking, of damping, of impact, of vibration, etc.).

More precisely, the rotation and the translation of the steering column of the steering wheel are dynamised by linear and rotary electric motors respectively.

As such, the rotation of the steering column is dynamised by a torque and vibration effect system that makes it possible to create torque effects and/or vibration effects around the axis of rotation of the game controller.

Furthermore, a new force feedback axis is provided on the game controller by at least one translation of the steering column thus offering new force feedback effects and simulations that are more realistic. It is possible to provide in particular a translation of the steering column carried out over a short distance of travel.

This translation is carried out according to the axis of the column or according to an axis that is close through an assembly of two sliding parts sliding in relation to one another and of an electromagnetic device simulating as such in particular effects of suspension, of acceleration and/or of deceleration, for example according to the technique described in patent application FR 1053757, filed by the Applicant.

Figure 7:
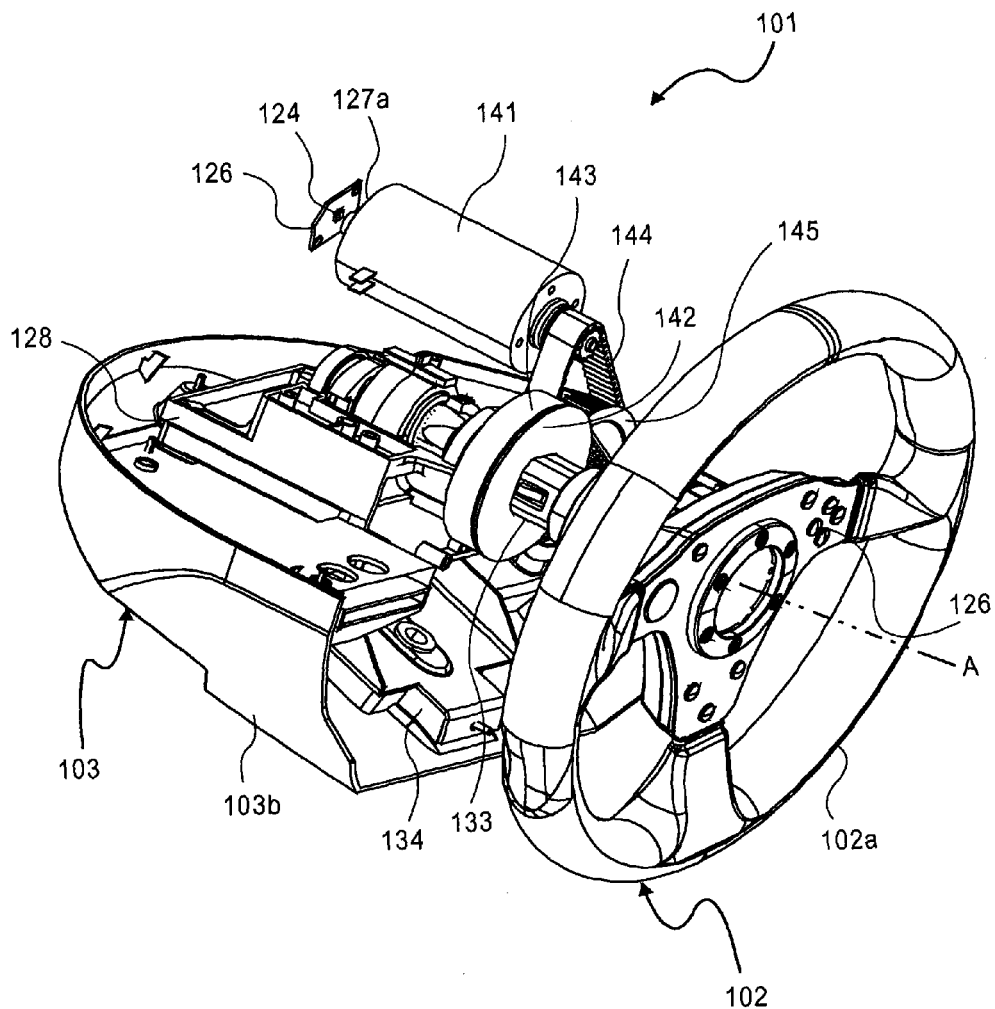
FIG. 7 is a view in perspective of the actuator and of a portion of the parts comprising the fixed part of the game controller according to a second preferred embodiment of the invention.
Figure 10C:
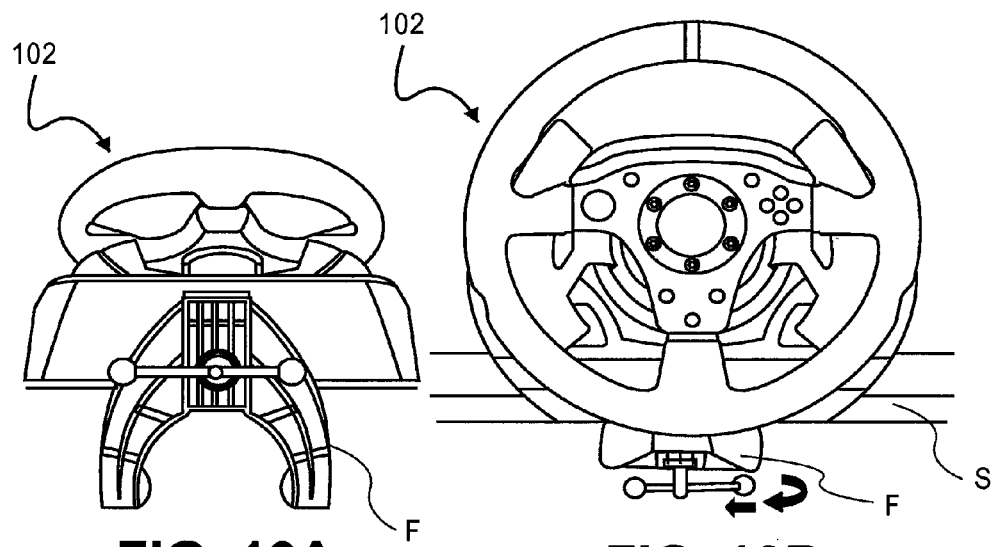
FIG. 10C is a view in perspective of the fixed part of the controller of FIG. 7.

FIG. 7 is a view in perspective of a second example of a game controller according to the invention. This controller 101 comprises an actuator 102, in the form of a steering wheel (steering wheel type of a saloon car, for example) mobile in rotation in relation to a fixed part or frame 103 according to an axis A of rotation, and which can be detached from this fixed part 103. The fixed part 103 can be mounted on a fixed support S through a known system of fastening F, as shown in FIGS. 10A and 10B. The fixed part 103 comprises, as shown in FIG. 10C, an upper shell 103a assembled in a removable manner to a lower shell 103b and to a front face 103c.

The lower shell 103b of the fixed part 103 provides the link or the fastening, whether or not reversible, of the controller 101 to a support such as a table, a worktop or a cockpit. The game controller 101 can be associated with pedals and, in the case where the shifting of speeds is not carried out at the steering wheel, to a gearbox separated from the steering wheel.

FIG. 7 shows, via a perspective view, the interior of the controller 101 once the upper shell 103a and the front face 103c are removed in particular.

In this figure can be distinguished a plate 134 connected in a fixed manner to the fixed part 103, the shaft 133 (which constitutes the steering column of the controller 101) to which is connected the actuator 102. The shaft 133 (or steering column 133) is integral with the actuator 102, and is therefore displaced in rotation around the axis A in the same way as the actuator 102.

Figure 8:
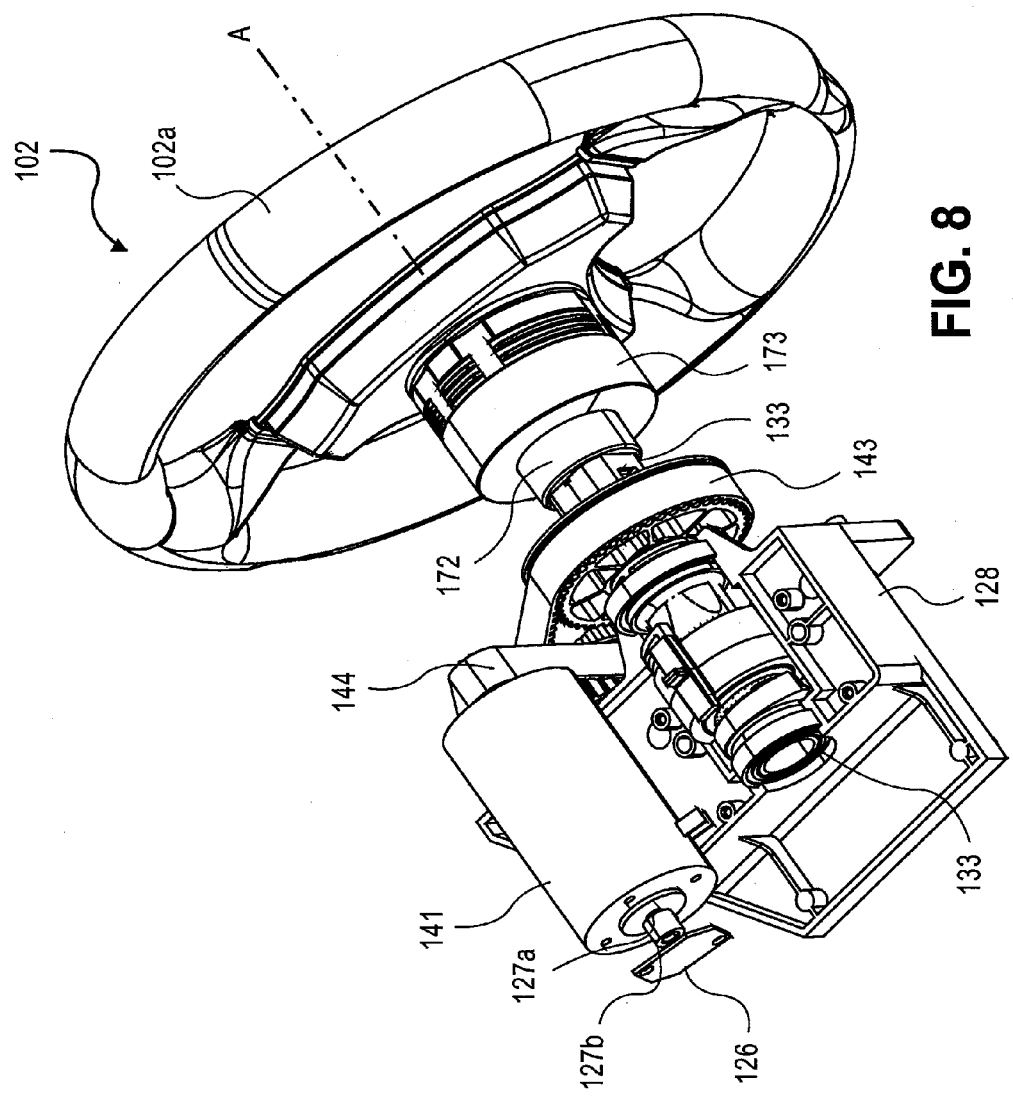
FIG. 8 is another view in perspective of the actuator and of a set of parts located inside the fixed part of the controller of FIG. 7.

FIG. 8 shows, via a perspective view, the interior of the controller 101 once the upper shell 103a, the front face 103c and the lower shell 103b are removed in particular.

The rotation of the steering column 133 is dynamised by a first system, referred to as the torque effect system and, where applicable, for vibration(s), by means, for example, of a rotary electric motor 141 of which the axis of rotation is more preferably substantially parallel to that of the steering column 133. The rotary electric motor 141 acts on the steering column 133 by the intermediary of a system of pulleys or toothed wheels and of belts or chains. In the embodiment shown, a toothed belt and toothed wheels are used.

In this case, a toothed wheel 142 of large diameter (for the precision) is fixed coaxially to the steering column 133. This toothed wheel 142 receives mechanically (via a train of toothed wheels and a toothed belt) the forces exerted by the electric motor 141 which is actuated according to the torque or vibration effects implemented by the game.

As such, on this toothed wheel 142 is mounted a toothed belt 143 connected to a small toothed wheel of the intermediary wheel 145. This intermediary wheel 145 comprises indeed a small toothed wheel (not shown as the intermediary wheel is shown only partially) and a large toothed wheel which are coaxial (the intermediary wheel 145 forms a single part but it could be formed from two parts fixed together). The large toothed wheel of the intermediary wheel 145 drives a toothed belt 144. This toothed belt 144 is connected to the shaft of the rotary electric motor 141 (which dynamises in rotation the shaft 133 of the actuator 102).

The toothed wheel 142, and therefore the steering column 133 and the actuator 102, pivots or stops its rotation around the axis A under the action of the electric motor 141. For example, it can return the actuator 102 to neutral position, or oppose the rotation of the steering column 133, cause the rotation of the steering column 133, cause shakes in the rotation of the steering column 133, etc.

Inversely, as the steering column 133 of the actuator (steering wheel in the case shown) 102 is connected to the rotary electric motor 141 via a system of toothed belt and wheel system, a movement of the actuator 102 is transmitted to the steering column 133 of the steering wheel and to the shaft (or axis) of the rotary electric motor 141.

As such, the system of toothed belts and wheels transmits the rotating movement of the shaft of the steering wheel to the shaft of the rotary electric motor (and reciprocally). In this sense, these shafts are integral in rotation.

Such a torque effect system using a rotary electric motor allows for a return to the centre (here, a return of the actuator 102 to neutral angular position) which does not limit the number of revolutions that the actuator 102 can carry out, contrary to what is made possible by a centre return system via elastic or spring(s).

A magnet carrier 127a (i.e. a magnet support 127a) is mounted integral with the axis or with the shaft of the rotary electric motor 141. This magnet carrier 127a, and therefore the magnet 127b, is mobile in rotation around the axis of rotation of the rotary electric motor 141.

A magnetic sensor (a biaxial Hall effect sensor here) 124 mounted on a PCB 126 is placed in the vicinity of the magnet carrier 127a substantially in the extension of the axis of the rotary electric motor 141.

In other terms, the magnetic sensor 124 is placed not across from the shaft 133 of the actuator 102 as in the first embodiment but across from the shaft of the rotary electric motor 141.

Figure 12:
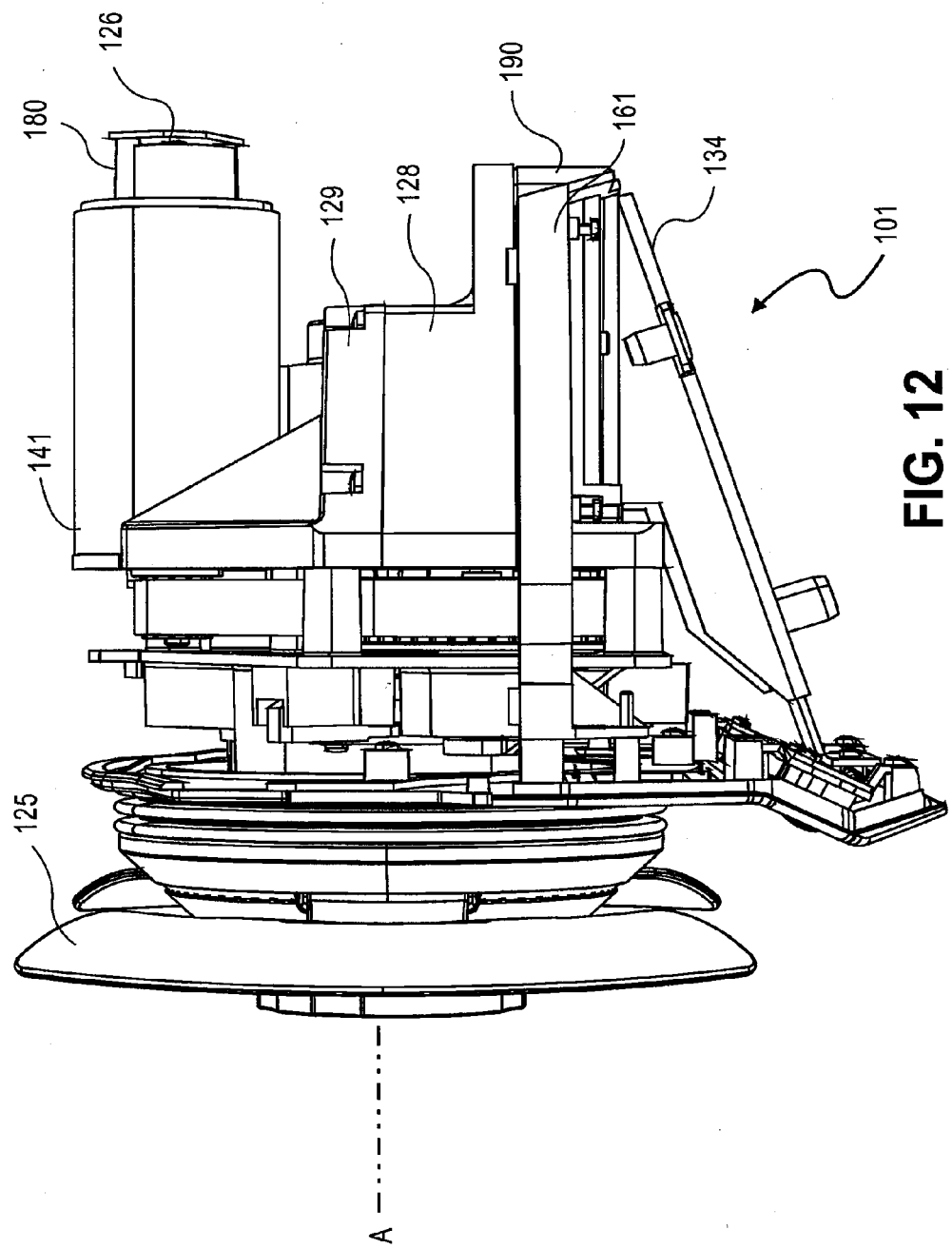
FIG. 12 is a side view of the inside of the fixed part of the controller of FIG. 7.

Note that the support of the PCB 126 of the magnetic sensor is not shown in FIGS. 7 and 8, but can be seen in FIG. 12 (referenced as 180). This support 180 of the PCB 126 and the magnetic sensor 124 are integral with the fixed part of the motor, i.e. with the case or envelope of the electric motor which is fixed by screws to the upper half-shell 129 of the rotary electric motor 141. The support 180 of the PCB 126 and the magnetic sensor 124 are not integral with the fixed part 103 of the controller 101.

As shall be seen in what follows, the rotary electric motor 141 is driven in translation, with the lower half-shell 128 and with the upper half-shell (which is not shown), by the linear electric motor in relation to the fixed part 103 of the controller 101. Moreover, the shaft 133 of the actuator 102 is mobile in rotation in relation to the lower half-shell 128 which is mobile in translation, but not in rotation, in relation to the fixed part 103 of the controller 101.

The steering column 133, and therefore the steering wheel 102, is dynamised in translation by a second system, referred to as a force feedback system.

To do this, the controller 102 of the game controller 101 is mounted mobile in translation in relation to the fixed part 103 according to its axis of rotation A or according to an axis close to (and therefore separate) this axis A, over a predetermined range of displacement, using an assembly of two sliding parts sliding in relation to one another. The displacement in translation of the controller 102 is controlled by an electromagnetic device 190 (or linear electric motor) which can be seen partially in FIG. 12 (the shoe 161 is concealing it almost entirely), and the same applies to the support 180 of the PCB 126 of the magnetic sensor.

More precisely, as shown in FIG. 13, the electromagnetic device 190 controls the displacement in translation of a guiding body 191 mobile in relation to the fixed support 103 and whereon are made integral the steering column 133 and the actuator 102. This guiding body 191 slides in relation to a guiding plate 192 which is integral with the fixed part 103.

The guiding body 191 has the form of a base with a substantially parallelepiped shape comprising a slot (or housing) that can be accessed by two rectangular openings located on two opposite faces of the base.

The guiding plate 192 has the form of a magnet carrier plate which carries at least one magnet (not shown) and comprises a part or penetrating portion 51 intended to be housed in the housing of the guiding body 191, as shown in FIG. 13. This magnet carrier plate 192 is furthermore integral (here via screwing) with the prongs 1341 of the plate 134 and with the two right 161 and left 160 shoes. The base of the guiding body 191 comprises at least one winding (not shown) which, according to the electric signal passing through it, causes the displacement of the base in relation to magnet carrier plate 192. It is easily understood that the direction, the travel (or range) and/or the speed of displacement of the base of the guiding body 191, and therefore of the steering column 133, are according to the electric signal running through the winding or windings. The maximum travel depends on the dimensions of the linear motor used. It is possible to use a linear motor of which the guiding body 191 is longer in order to obtain an amplitude of relative displacement of the guiding body 191 that is greater in relation to magnet carrier plate 192 and therefore a maximum travel of the steering column 133 that is longer.

Note that in this second preferred embodiment, the steering column 133 is not horizontal but inclined in relation to the horizontal in order to make it possible to have the user feel the force feedback effect according to four directions (up, down, front, rear) thanks to only an electromagnetic device, a guiding body 191 and a guiding plate 192.

In an alternative embodiment described hereinabove, the guiding body 191 can be integral with the fixed part 103 and the guiding plate 192 can be integral with the actuator 102.

In another embodiment, the steering column 133 can be substantially horizontal.

Figure 11:
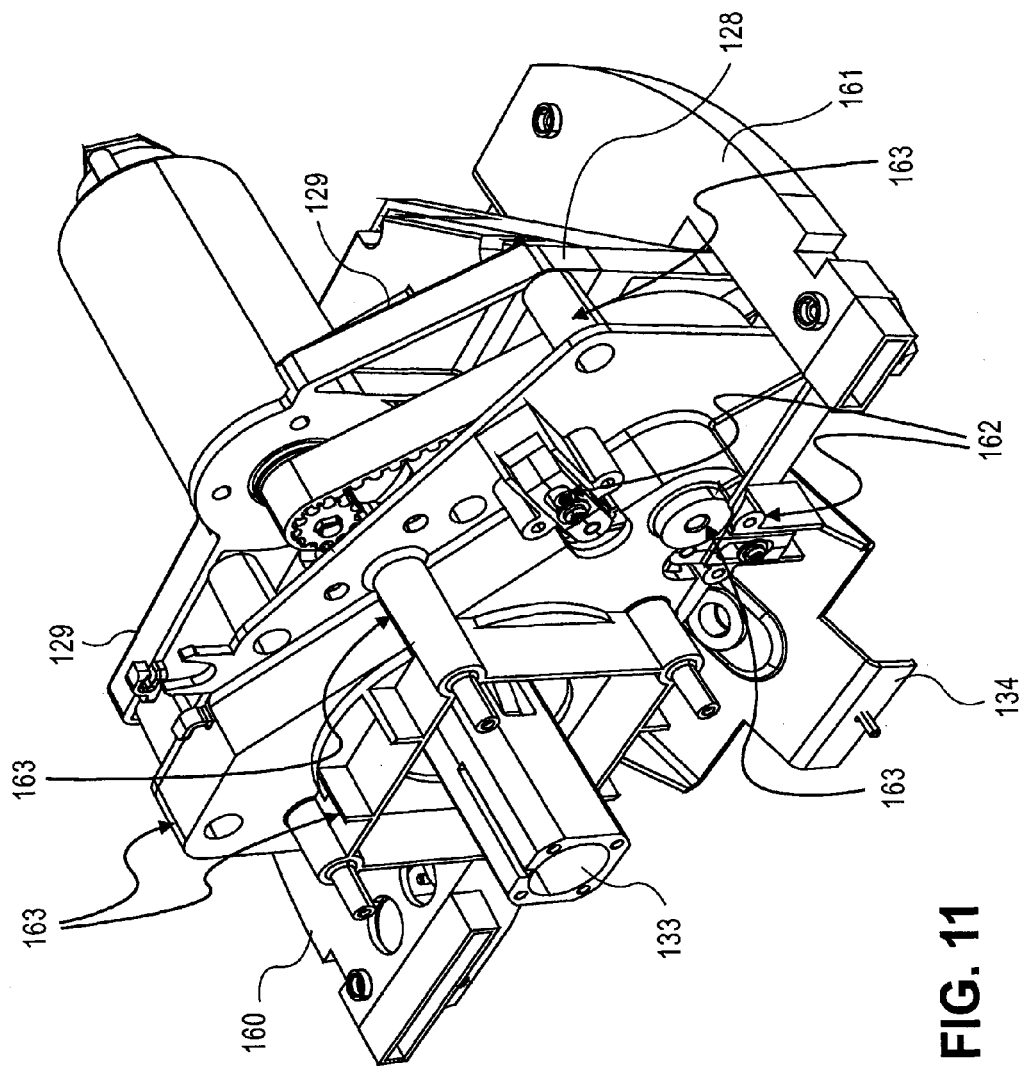
FIG. 11 is another view in perspective of parts located inside the fixed part of the controller of FIG. 7.

In FIG. 11, the interior of the controller 101 can be distinguished once the steering wheel 102, the upper shell 103a, the lower shell 103b and the front face 103 are removed (as well as the paddles 125 for speed change, the cover 174, the bellows 175, the stick 172 with its connector 123, and the nut 173). The lower 128 and upper 129 half-shells are fixed together, for example, by screws.

In order to allow for the translation of the steering column 133 (and at the same time of the half-shells 128, 129 and of the torque and vibration effect system, implementing the rotary electric motor 141 in particular), a linear electric motor (the linear electric motor is not shown in FIG. 11, but can be seen in FIG. 13 (referenced as 190)) comprising two elements, one being mobile in translation in relation to the other according to an electric signal, is implemented. One of the elements of the linear electric motor is fixed to the plate 134 and to the two right 161 and left 160 shoes (which are fixed in relation to the fixed part 103) and the other element is fixed to the lower half-shell 128, for example by screws.

Moreover, a plate 163 is fixed to the half-shells 128, 129, for example by screws, this plate 163 being mobile in translation but not in rotation. It comprises two roller tensioners 162 which act on the toothed belt 143.

The controller 101 comprises a system of fastening which makes it possible to fix and to lock reversibly the actuator 102 to the fixed support 103 in such a way as to allow for the transmission of the rotating movement of the actuator 102 towards the steering column which, in this embodiment, is the shaft 133.

Figure 9:
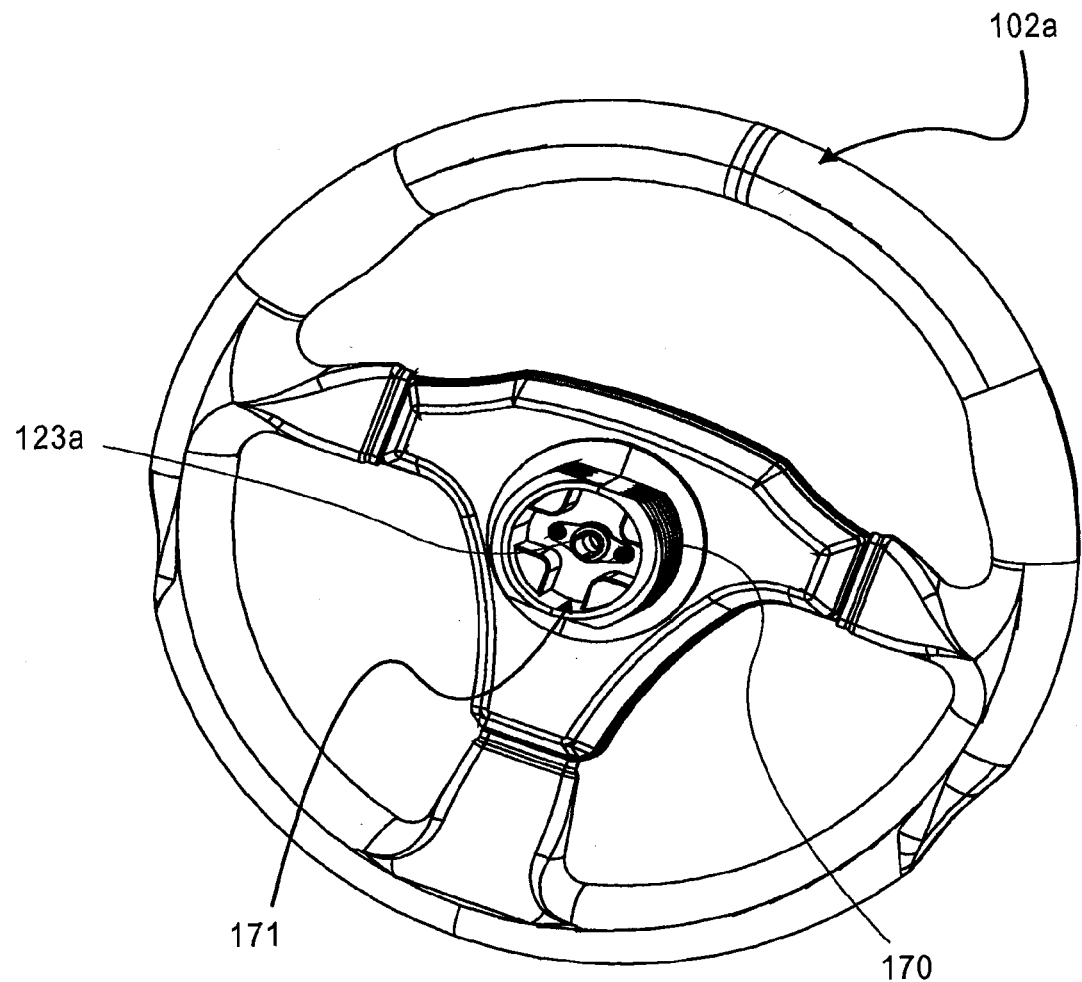
FIG. 9 is a view in perspective of the actuator of the controller of FIG. 7.

FIG. 9 shows the steering wheel 102a when it is detached from the fixed part 103. The steering wheel 102a comprises a threaded tip 170 which comprises a cavity-receptacle 171, in the form of a female end, wherein is housed a connector 123a, for the supply of electrical energy and/or data transmission. This data corresponds for example to information on the rotation of the actuator 102, and where applicable additional information, such as a speed change command, when the user acts on the paddles 125 (which can be seen in FIG. 10C), or other commands triggered by the activation of buttons 126 (which can be seen in FIG. 7) located on the actuator 102, or where applicable to states to be displayed by indicators, or finally to information on the vibrations (or electric signals corresponding to the vibrations) which must be executed by small vibration systems incorporated into the wheel of the steering wheel 102a (such a vibration system comprises a small rotating electric motor and a dissymmetric mass fixed to the shaft of this small motor, in such a way that the centre of gravity of this mass is separated from the axis of rotation of the small rotating electric motor and that this causes an unbalance and therefore vibrations in the wheel of the steering wheel 102a).

Figure 10C:
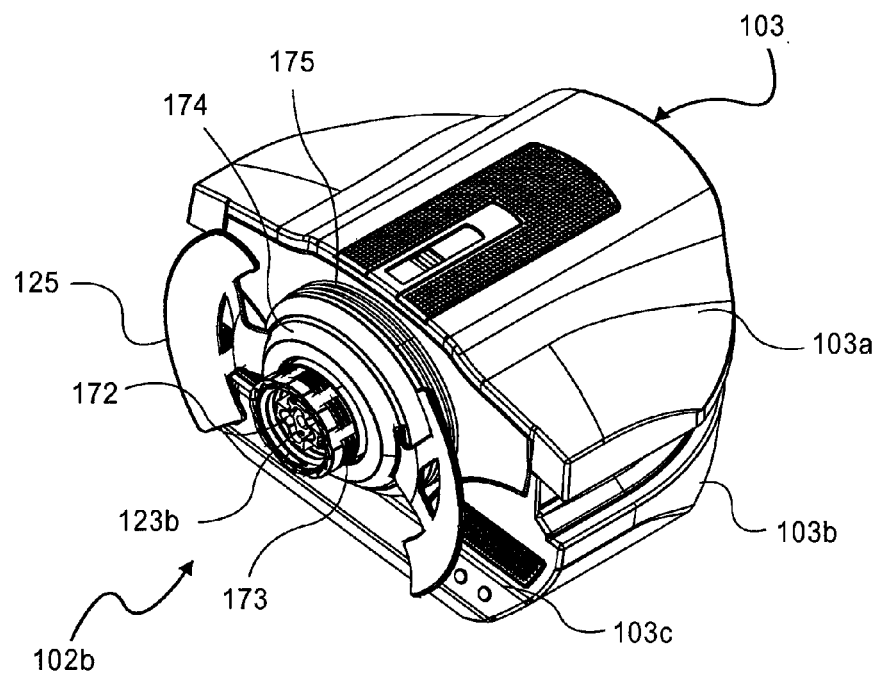

The other part 102b of the actuator 102 integral with the front face 103c of the fixed part 103 is shown in FIG. 10. It comprises a stick 172 in the form of a male end which is fixed to the shaft 133 of the actuator 102. A movable ring or nut 173 of which the inside bore is threaded is placed on the stick 172. The nut 173 is mobile in rotation and in translation as long as it is not screwed, a shoulder of the stick 172 however forming a stop in translation which prevents the nut 173 from becoming completely separated from the stick 172.

In order to attach the steering wheel 102a shown in FIG. 9 to the part 102b of the actuator 102 shown in FIG. 10, it is required to push the steering wheel 102a against the stick 172 of the steering column or shaft 133 of the actuator 102 and to place the male end of the stick 172 into the female end of the cavity-receptacle 171 of the tip 170 of the steering wheel 102a. It is then required to turn the nut 173 in order to screw it onto the screw thread of the threaded tip 170 of the steering wheel 102a. The steering wheel 102a is then integral in rotation and in translation with the stick 172 and therefore with the steering column 133.

Of course, it is possible to replace this system of fastening of the steering wheel 102a with the system of fastening described in the first preferred embodiment in such a way that the fixed part 103 uses the system of fastening which makes it possible to fix and to lock reversibly the actuator 2 onto a linking part 31. The actuator 2 can then be fixed reversibly onto such a fixed part. In this case (if the steering wheel 102a comprises electrical elements), the connector 123 is replaced with a connector 23 (or with a case of batteries and where applicable a wireless transmission device if signals must be sent or received by the steering wheel 102a).

FIG. 10C also shows a bellows 175 and a cover 174, intended to prevent, or at least limit, the presence of dust and fouling in the fixed part 103 of the controller 101.

The other part 102b of the actuator 102 further comprises a connector 123b, with the electric signals being sent via these connectors 123a, 123b in a bidirectional manner.

The dimensions and the forms of the tip 170 of the actuator 102, of the stick 172 and of the nut 173 are selected in such a way that the connectors are not subjected to any substantial forces and, consequently, are not degraded.

Many other means for reversible fastening can of course be implemented, without leaving the scope of the invention, including a simple nesting by force of the steering wheel 102a on the steering column 133, in a simplified embodiment.

According to a particular embodiment of the invention, the magnetic sensor 124 provides in real time the data which allow a microprocessor to control in real time the displacement in rotation (and where applicable the displacement in translation), by determining in real time the actual displacement or displacements (the actual travel and the actual angle can be measured directly but it is also possible to determine the actual direction, acceleration and speed of the displacement).

This particular embodiment makes it possible to take into account the consequences caused by the forces exerted by the user on the actuator 102 (and therefore on the steering column 133 and on the shaft of the rotary electric motor 141 which is integral with it) and to adjust the electric signal if required. It allows for a control of the displacement in rotation (and, where applicable, of the displacement in translation). In this particular embodiment, the displacement is therefore controlled.

In the second embodiment shown in particular in FIGS. 7 and 9, the part 102a of the actuator comprises buttons 126 and a connector 123a. According to an alternative of the invention, the actuator 102a may contain no element controlling or carrying electric currents (in particular no button and no connector). Indeed, the actions which correspond to the buttons can be carried out via one or several devices of the fixed part 103, more precisely thanks to one or several control devices. These control devices can, for example, have the form that resembles that of a windscreen wiper control stick and/or that of a turn signal control stick. Moreover, note that the presence of vibration systems incorporated into the wheel of the steering wheel 102a is not indispensable as the torque effect system is also able to produce vibrations and this in a more realistic manner. Consequently, according to this alternative, only the fixed part 103 then comprises elements that control or that carry electric currents (all of the "electrical" elements of the game controller are then grouped together in the fixed part 103), contrary to the first preferred embodiment of the invention according to which the actuator 2 groups together all of the "electrical" elements).

Due to the absence of the need for permanent contact between the actuator 2, 102 and the fixed part 3, 103, the actuator can easily be changed for another type of actuator. This can be done in coherency with the software and more precisely according to the vehicle simulated by the software, and makes it possible to adapt the ergonomics and the feeling of the various actuators.

For example, the user can easily change an actuator of the steering wheel type to install an actuator of the handlebar type if the video game with which he is playing simulates a motorcycle, instead of a steering wheel mounted beforehand. It is also possible to provide variations of the steering wheel, according to the type of simulated vehicle. For cars, the variations of steering wheel can in particular be: formula 1, saloon, rally, all-terrain, kart, etc. For trains, the variations can be: Micheline, T.G.V., etc. For motorbikes, the variations in handlebars can be: unprepared motorcycle, racing motorcycle, off-road motorcycle, rally motorcycle, scooter, etc. For bicycles, the variations in handlebars can be: racing cycle, hybrid bicycle, mountain bicycle, city bicycle, etc. for boats, the variations in helm wheels can be: galleon wooden helm, helm of a modern sailing ship, fly-wheel, etc. The actuators can therefore have different shapes, different diameters, different buttons in such a way that their ergonomics is adapted to the type of simulated vehicle. They can further comprise motors with different vibrations, they can be wired or wireless (for data transmission), etc.

It is also possible to provide, in a particular embodiment, that the number of revolutions that the actuator can carry out in relation to the fixed part differ according to the type of actuator used or according to the type of fixed part used or according to the range level of the controller. As such, magnetic sensors or different magnets can be provided, according to the actuators, in such a way as to obtain different restored effects, a different resolution (more or less precise displacement measurements), and/or a resistance that is more or less strong to the magnetic disturbances or to the temperature variations, etc.

In the figures, the game controller is shown without a device providing the link with the floor or the reversible or non-reversible fastening with a support such as a table or a worktop or a cockpit. Such devices exist. For example, the game controller can be provided with a device according to U.S. Pat. No. 6,378,826 and in this case, with a fixed part carried out according to the first preferred embodiment, the fixed part and the device do not comprise any element operating thanks to electric currents or to electromagnetic fields and no element that controls or that carries electric currents. More preferably, this device can be separated from the fixed part.

According to another embodiment of the invention, the first embodiment is combined with the second embodiment described hereinabove. In particular, the fixed part 3 can be modified in such a way that this fixed part comprises the first torque and vibration effect system and the second system, referred to as force feedback system, described in the second preferred embodiment. A first Hall effect or magnetoresistive effect detecting unit can be used to measure the displacement in rotation of the axis of the rotary electric motor 141 of the torque and vibration effect system. To this effect, a magnetic sensor 124 mounted on a PCB 126 can then be placed in the vicinity of the magnet carrier 127a substantially in the extension of the axis of the rotary electric motor 141 in order to measure the displacement in rotation of the magnet 127b. It is also possible to measure the displacement in translation of the steering column:

either via a second sensor (placed on a PCB screwed to a support fixed to the shoe or to the upper shell 103a) measuring the displacement in translation of the magnet 127b (i.e. the displacement in translation of the axis of the rotary electric motor 141 of the torque and vibration effect system which is integral in translation with the steering column 133);

or via a second Hall effect or magnetoresistive effect detecting unit measuring the displacement in translation of the steering column (or of another part integral in translation with the steering column).

In such an embodiment, a magnetic sensor on board in the actuator 2 (intended to cooperate with a magnet 37 of the fixed part which is placed in the vicinity of the system of fastening) is no longer indispensable as the information pertaining to the measurement of the displacement of the steering column in rotation is then redundant with the information from the first Hall effect or magnetoresistive effect detecting unit. However, the magnetic sensor on board in the actuator makes it possible to detect the presence and the type of fixed part with which cooperates the actuator 2 (if the fixed part incorporates the first detection unit, then in order to prevent redundancy and save energy, it is possible to automatically deactivate the detection unit on board in the actuator until the reinitialising or the turning back on of the game controller, and to deactivate all of the on-board circuits if the fixed part comprises all of the required commands and if the user has not pressed a button for the activation of the actuator for a predetermined period of time). Furthermore, the presence of the magnetic sensor on board in the actuator renders the actuator 2 fully compatible with the various types of fixed parts (those that comprise and those that do not comprise a first Hall effect or magnetoresistive effect detecting unit).

The invention claimed is:

1. A game controller having a shaft, an actuator which is mobile at least in rotation in relation to a fixed part around an axis of rotation of said actuator, in such a way as to simulate a control of a simulated steering column of a simulated vehicle, characterized in that it comprises at least a first Hall effect or magnetoresistive effect detecting unit for detecting at least rotary displacement of said actuator, said Hall effect or magnetoresistive effect detecting unit constituted of at least two elements, of which one element is a first magnet and a first magnetic sensor, wherein, at least during the rotation of said actuator, said first magnet is substantially aligned with the axis of rotation of said actuator, and wherein, at least during the rotation of said actuator, said first magnetic sensor is substantially aligned with the axis of rotation of said actuator, and wherein said actuator and said shaft are substantially coaxial at least during the rotation of said actuator, and in that, at least during the rotation of said actuator, a first of said elements has no rotary degree of freedom with respect to said actuator, and in that, at least during the rotation of said actuator, a second of said elements has no rotary degree of freedom with respect to said fixed part.

2. The game controller according to claim 1, characterized in that said shaft comprises a hollow interior space extending in a direction parallel to the direction of the axis of rotation of said actuator.

3. A game controller having at least a first graspable part, and a first motion generator, said motion generator comprising at least two parts, of which one part is a non-rotatable part and another part is a rotatable part which is at least mobile in rotation in relation to said non-rotatable part, wherein said first graspable part is at least mobile in rotation with respect to said non-rotatable part;

wherein said first motion generator, in use, generates at least displacement in rotation of said rotatable part in relation to said non-rotatable part, wherein, at least during the rotation of said rotatable part of said first motion generator, said first graspable part has no rotary degree of freedom with respect to said rotatable part, in such a way said first graspable part is at least dynamized in rotation by said first motion generator, wherein the game controller further comprises at least one Hall effect or magnetoresistive effect detecting unit for the detection of at least the displacement in rotation of said rotatable part of said first motion generator, said Hall effect or magnetoresistive effect detecting unit comprising at least two elements, of which one element is a first magnet and another element is a first magnetic sensor, in that, at least during the rotation of said first graspable part, a first of said elements has no rotary degree of freedom with respect to said rotatable part of said first motion generator, in that, at least during the rotation of said first graspable part, a second of said elements has no rotary degree of freedom with respect to said non-rotatable part of said first motion generator, and in that, at least during the rotation of said first graspable part, a displacement of at least one of the parts of said first motion generator is measured by said at least one Hall effect or magnetoresistive effect detecting unit, in such a way said at least one Hall effect or magnetoresistive effect detecting unit senses directly said first motion generator.

4. The game controller according to claim 3, wherein said first motion generator causes displacement in rotation of said rotatable part in relation to the non-rotatable part by elasticity or electromagnetism, wherein said rotatable part is a rotor.

5. The game controller according to claim 4, wherein at least during the rotation of said first graspable part, said first magnetic sensor measures at least rotation of said first magnet.

6. The game controller according to claim 5, wherein at least during the rotation of said first graspable part, said first magnet is carried by said rotor.

7. The game controller according to claim 6, wherein said first motion generator is a rotary electric motor, and in that, at least during the rotation of said first graspable part, said first magnetic sensor is integral with said non-rotatable part of said rotary electric motor.

8. The game controller according to claim 5, wherein said game controller further comprises a second sensor.

9. The game controller according to claim 8, wherein said second sensor is a rotation sensor to detect at least the displacement of said first graspable part.

10. The game controller according to claim 9, wherein at least during the rotation of said first graspable part, said second sensor is a second magnetic sensor substantially aligned with the axis of rotation of said first graspable part.

11. The game controller according to claim 8, wherein said second sensor measures at least translation of said rotor.

12. The game controller according to claim 5, wherein said game controller further comprises a shell which has no rotary degree of freedom with respect to said non-rotatable part,
and in that said game controller further comprises a linear electric motor comprising two components, one being mobile in translation in relation to the other according to an electric signal,
wherein one of said components of said linear electric motor is fixed to said non-rotatable part and the other component is fixed to said shell for procuring at least vibration effects.

13. The game controller according to claim 12, wherein said first magnetic sensor is fixed in relation to said shell.

14. The game controller according to claim 4, wherein said first graspable part and said rotor are substantially coaxial at least during the rotation of said first graspable part.

15. The game controller according to claim 14, wherein said first rotatable part comprises an interior space extending in a direction parallel to the direction of the axis of rotation of said first graspable part.

16. The game controller according to claim 14, wherein at least during the rotation of said first graspable part, said first graspable part is directly linked to said rotatable part, in such a way said rotatable part is acting directly to the first graspable part as if the rotatable part and the first graspable part would be a single part.

17. The game controller according to claim 16, wherein said game controller comprises a linking part to removably attach said first graspable part to said rotatable part.

18. The game controller according to claim 3, wherein said first graspable part is selected from the group consisting of:
a steering wheel;
a handlebar; and
a ship helm.

19. The game controller according to claim 3 further comprising a second graspable part interchangeable with said first graspable part.

20. A game controller having at least a first graspable part, and a first motion generator which comprises at least a non-rotatable part and a rotatable part which is at least mobile in rotation in relation to said non-rotatable part,
wherein said first graspable part is at least mobile in rotation with respect to said non-rotatable part;
wherein said first motion generator, in use, generates at least displacement in rotation of said rotatable part in relation to said non-rotatable part,
wherein the game controller further comprises at least one Hall effect or magnetoresistive effect detecting unit for the detection of at least the displacement in rotation of said rotatable part of said first motion generator, said Hall effect or magnetoresistive effect detecting unit comprises at least two elements, of which one element is a first magnet and another element is a first magnetic sensor,
in that, at least during the rotation of said first graspable part, a first of said elements has no rotary degree of freedom with respect to said rotatable part of said first motion generator,
in that, at least during the rotation of said first graspable part, a second of said elements has no rotary degree of freedom with respect to said non-rotatable part,
and in that, at least during the rotation of said first graspable part, said first Hall effect or magnetoresistive effect detecting unit takes measures at the first motion generator.

* * * * *